(12) United States Patent
Mendel et al.

(10) Patent No.: US 11,675,060 B2
(45) Date of Patent: Jun. 13, 2023

(54) LIDAR SYSTEM, A METHOD FOR A LIDAR SYSTEM AND A RECEIVER FOR LIDAR SYSTEM HAVING FIRST AND SECOND CONVERTING ELEMENTS

(71) Applicant: Infineon Technologies AG, Neubiberg (DE)

(72) Inventors: Stefan Mendel, Graz (AT); Franz Michael Darrer, Graz (AT); Thomas Gigl, Graz (AT); Michiel Helsloot, Rosmalen (NL); Boris Kirillov, Graz (AT); Francesco Secli, Graz (AT); Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 361 days.

(21) Appl. No.: 16/884,317

(22) Filed: May 27, 2020

(65) Prior Publication Data

US 2020/0379093 A1 Dec. 3, 2020

(30) Foreign Application Priority Data

May 27, 2019 (DE) .......................... 102019207741.2

(51) Int. Cl.
*G01S 7/4863* (2020.01)
*G01S 17/89* (2020.01)

(52) U.S. Cl.
CPC ............ *G01S 7/4863* (2013.01); *G01S 17/89* (2013.01)

(58) Field of Classification Search
CPC .................................................... G01S 17/89
See application file for complete search history.

(56) References Cited

U.S. PATENT DOCUMENTS

| 6,392,747 B1 | 5/2002 | Allen et al. | |
| 7,701,558 B2 * | 4/2010 | Walsh | ................... G01S 7/4865 356/5.1 |

(Continued)

FOREIGN PATENT DOCUMENTS

| CN | 109085606 A | 12/2018 |
| CN | 109581399 A | 4/2019 |

(Continued)

OTHER PUBLICATIONS

Wuhuang H., et al., "Research On High-speed Full Waveform Acquisition and High-precision Positioning Technology In Laser Remote Sensing," Journal of Instrumentation, Jan. 2013, vol. 34(1), pp. 73-79.

*Primary Examiner* — Irfan Habib
(74) *Attorney, Agent, or Firm* — Harrity & Harrity, LLP

(57) ABSTRACT

A receiver for a light detection and ranging system includes detecting elements, each configured to convert light into an analog detection signal. The receiver includes a first converting element configured to provide a first digital detection signal in response to a first analog detection signal. The first converting element is configured to use a first number of bits to represent the first analog detection signal. The receiver includes a second converting element configured to provide a second digital detection signal. The second converting element is configured to use a second number of bits to represent the second analog detection signal. The second number of bits is greater than the first number of bits. The receiver comprises a processing module configured to determine a first parameter of an object using the first digital detection signal and a second parameter of the object using the second digital detection signal.

26 Claims, 21 Drawing Sheets

(56) References Cited

U.S. PATENT DOCUMENTS

| | | | | |
|---|---|---|---|---|
| 7,894,044 B1* | 2/2011 | Sullivan | G01S 7/4818 | 356/5.01 |
| 8,908,157 B2 | 12/2014 | Eisele et al. | | |
| 9,069,061 B1* | 6/2015 | Harwit | G01S 7/4818 | |
| 9,529,079 B1 | 12/2016 | Droz et al. | | |
| 9,841,495 B2* | 12/2017 | Campbell | G01S 7/4816 | |
| 9,958,545 B2* | 5/2018 | Eichenholz | G01S 7/484 | |
| 10,048,376 B2* | 8/2018 | Kubota | G01S 17/14 | |
| 10,641,873 B2* | 5/2020 | Dussan | G01S 7/4868 | |
| 10,816,663 B2* | 10/2020 | Ota | G01S 17/89 | |
| 10,866,311 B2* | 12/2020 | Kubota | G01S 7/487 | |
| 11,255,968 B2 | 2/2022 | Lee | | |
| 11,275,146 B2* | 3/2022 | Kirillov | G01S 7/4817 | |
| 11,283,598 B2* | 3/2022 | Zeh | H04L 9/0662 | |
| 11,415,671 B2* | 8/2022 | Meissner | G01S 7/487 | |
| 11,433,910 B2* | 9/2022 | Roger | B60R 21/0134 | |
| 11,550,044 B2* | 1/2023 | Kudla | G01S 7/497 | |
| 2006/0197936 A1* | 9/2006 | Liebman | G01S 17/42 | 398/43 |
| 2006/0227315 A1* | 10/2006 | Beller | G01S 17/74 | 356/3 |
| 2009/0059201 A1* | 3/2009 | Willner | G01S 17/58 | 356/5.01 |
| 2009/0292468 A1* | 11/2009 | Wu | G08G 1/165 | 342/146 |
| 2010/0204964 A1* | 8/2010 | Pack | G06T 7/521 | 703/2 |
| 2011/0085155 A1* | 4/2011 | Stann | G01C 3/08 | 356/4.01 |
| 2011/0149360 A1* | 6/2011 | Sourani | H04N 9/3129 | 359/212.1 |
| 2012/0038903 A1* | 2/2012 | Weimer | G01C 3/08 | 250/208.2 |
| 2012/0236379 A1* | 9/2012 | da Silva | G02B 26/0841 | 359/200.8 |
| 2012/0249996 A1* | 10/2012 | Tanaka | G01S 17/42 | 356/4.01 |
| 2015/0131080 A1 | 5/2015 | Retterath et al. | | |
| 2017/0176578 A1* | 6/2017 | Rae | G01S 17/003 | |
| 2018/0031703 A1* | 2/2018 | Ngai | G01S 7/484 | |
| 2018/0075309 A1* | 3/2018 | Sathyanarayana | G05D 1/0055 | |
| 2018/0120436 A1* | 5/2018 | Smits | G01S 7/4817 | |
| 2018/0143324 A1* | 5/2018 | Keilaf | G08G 1/04 | |
| 2018/0275252 A1* | 9/2018 | Fried | G01S 7/4817 | |
| 2018/0299534 A1* | 10/2018 | LaChapelle | G01S 17/89 | |
| 2018/0364340 A1 | 12/2018 | Ichiyanagi | | |
| 2019/0086522 A1* | 3/2019 | Kubota | G01S 17/10 | |
| 2019/0086550 A1* | 3/2019 | Dussan | G01S 7/4861 | |
| 2019/0250257 A1* | 8/2019 | Finkelstein | G01S 17/10 | |
| 2019/0271767 A1* | 9/2019 | Keilaf | G01S 7/4817 | |
| 2020/0264286 A1* | 8/2020 | Dussan | G01S 7/4863 | |
| 2021/0048521 A1* | 2/2021 | Leduc | G01S 13/75 | |
| 2021/0263155 A1* | 8/2021 | Miller | H01L 27/14643 | |
| 2021/0325540 A1* | 10/2021 | Spickermann | G01S 7/4817 | |
| 2022/0018943 A1* | 1/2022 | Li | G01S 7/4863 | |

FOREIGN PATENT DOCUMENTS

| | | |
|---|---|---|
| CN | 109581401 A | 4/2019 |
| DE | 102016224509 A1 | 6/2018 |
| EP | 2182378 A1 | 5/2010 |
| EP | 3130890 A1 | 2/2017 |

* cited by examiner

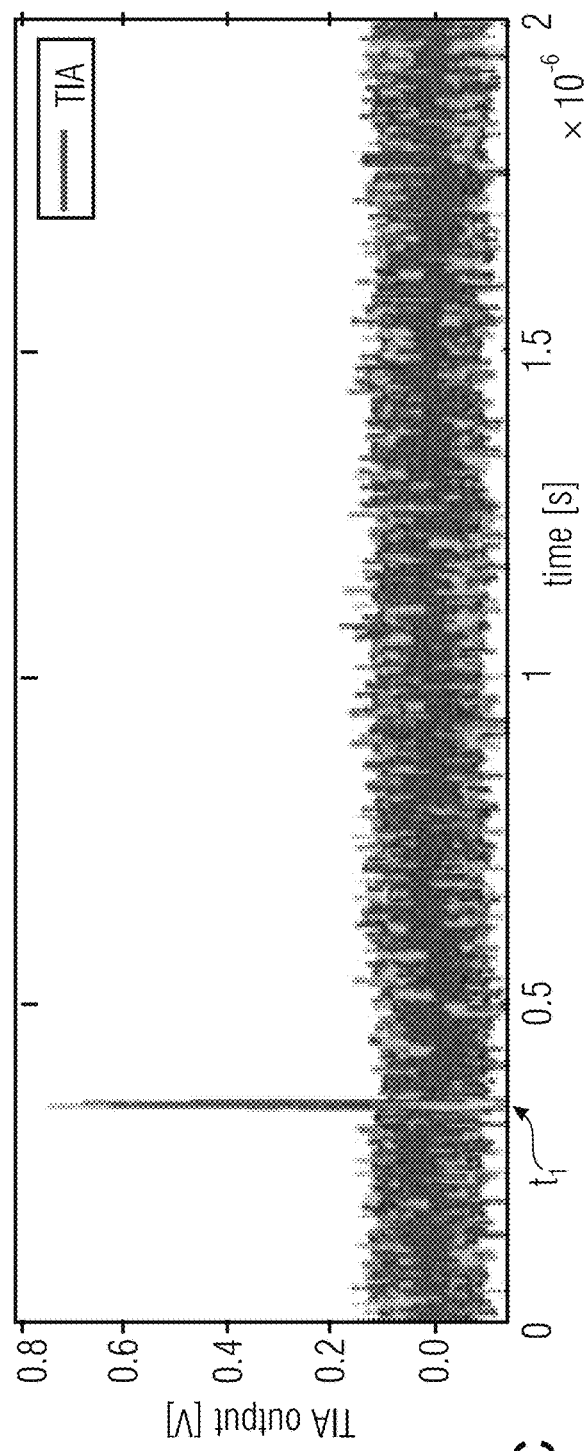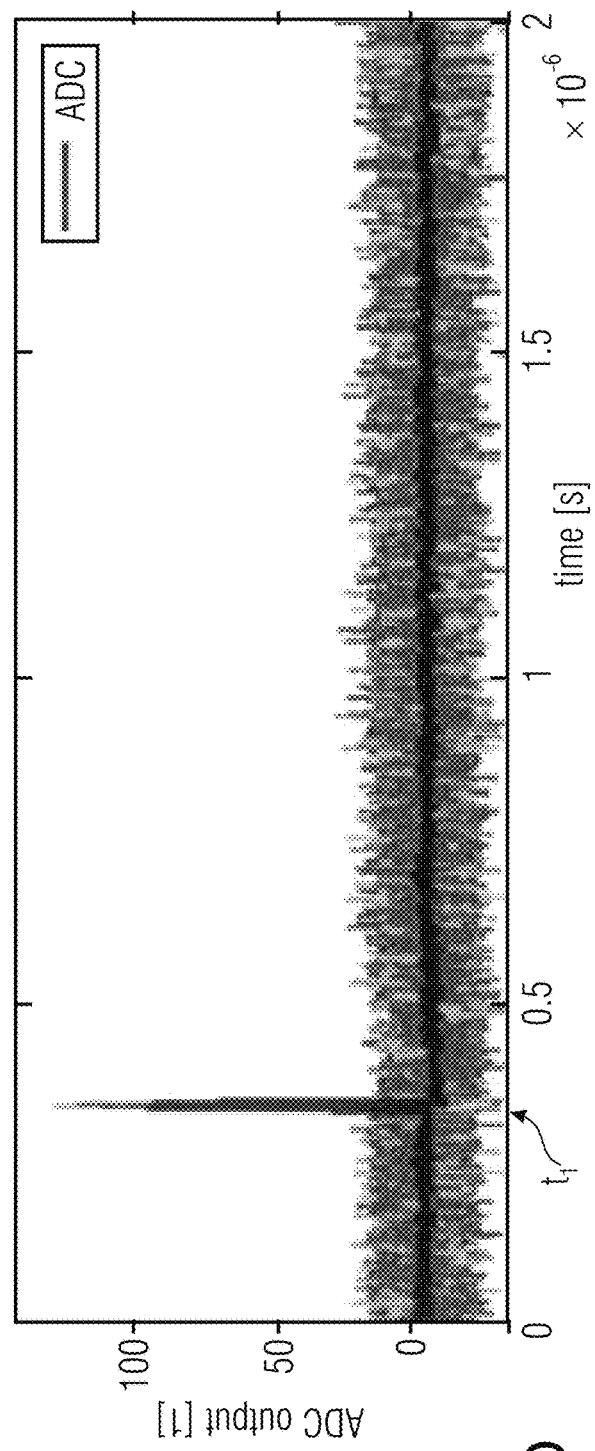
Fig. 9C
Fig. 9D

LIDAR SYSTEM, A METHOD FOR A LIDAR SYSTEM AND A RECEIVER FOR LIDAR SYSTEM HAVING FIRST AND SECOND CONVERTING ELEMENTS

FIELD

The present application relates to light detection and ranging (LIDAR) applications. More specifically, it relates to a LIDAR system, a method for a LIDAR system and a receiver for LIDAR system having converting elements providing digital detection signals in response to analog detection signals. The analog signals are provided by detecting elements having members converting light into electrical signals is response to a laser pulse emitted by a transmitter of the LIDAR system.

BACKGROUND

LIDAR systems illuminate objects in a target area with laser light and measure the reflected light with a sensor. The time of flight of the laser light correlates with a distance between a LIDAR system and the objects in the target area. The intensity of the sensed light allows for determining of the reflectivity of the objects. The reflected laser light is typically sensed by photo diodes, the electric current of which is amplified and provided for a conversion into the digital domain. After acquisition of raw sensor data, signal processing is applied in order to obtain a 3D point cloud.

Generally, multi-bit analog-to-digital converters are used for signal amplitude analyses, for example, in order to detect lane markings in automotive applications. High sampling rates are used for accurate range resolutions, for example, a sampling rate of 1.5 GHz is used for a 10 cm range resolution. The number of the analog-to-digital converters in a LIDAR system, their resolution and sampling rate contribute to the used computational resources and power dissipation of the LIDAR system.

SUMMARY

It is desirable to have a flexible approach for converting signals sensed in a LIDAR system into their digital representation for further processing.

Examples of the disclosure provide a receiver for a light detection and ranging (LIDAR) system. The receiver includes a plurality of detecting elements. Each detecting element includes one or more members configured to convert light into an electric signal. Each detecting element is configured to provide an analog detection signal in response to a laser pulse emitted by a transmitter of the LIDAR system. The receiver includes at least one first converting element configured to provide a first digital detection signal in response to a first analog detection signal provided by at least one of the plurality of detecting elements. The first converting element is configured to use a first number of bits to represent the first analog detection signal. The receiver includes at least one second converting element configured to provide a second digital detection signal in response to a second analog detection signal provided by at least one of the plurality of detecting elements. The second converting element is configured to use a second number of bits to represent the second analog detection signal. The second number of bits is greater than the first number of bits. The receiver includes a processing module configured to determine at least a first parameter of an object in a target area of the LIDAR system using the first digital detection signal and a second parameter of the object using the second digital detection signal.

Examples of the disclosure provide a method for operating a receiver of a light detection and ranging (LIDAR) system. The method includes the step of providing, by each of a plurality of detecting elements, an analog detection signal in response to a laser pulse emitted by a transmitter of the LIDAR system, each detecting element including one or more members configured to convert light into an electric signal. The method further includes the step of providing, by at least one first converting element, a first digital detection signal in response to a first analog detection signal provided by at least one of the plurality of detecting elements. The first converting element uses a first number of bits to represent the first analog detection signal. The method further includes the step of providing, at least one second converting element, a second digital detection signal in response to a second analog detection signal provided by at least one of the plurality of detecting elements. The second converting element uses a second number of bits to represent the second analog detection signal. The second number of bits is greater than the first number of bits. The method includes further the step of determining, by a processing module, at least a first parameter of an object in a target area of the LIDAR system using the first digital detection signal, and a second parameter of the object using the digital detection signal.

Using two-fold converting elements with different number of bits to represent the respective analog detection signals in a receiver of a LIDAR system may advantageously allow for balancing the effort in terms of processing complexity and power dissipation and the resolution of the digital conversion in terms of the number of bits used to determine a particular parameter or parameters of an object in the target area of the LIDAR system. Examples of the present disclosure may allow for using conversion elements, the resolution of which most adequately corresponds to the resolution necessary to determine a desired parameter, such as the detection, ranging or reflectivity. The usage of the processing resources and the power dissipation may be advantageously improved.

In other words, according to examples of the disclosure, a hybrid architecture (e.g., 1-bit/ADC architecture) may deal with conflicting requirements between detection/ranging and reflectivity measurements: On the one hand, a fine time-resolution for ranging and oversampling/averaging (e.g., emitting laser pulses several times at the same target to improve the signal to noise ratio) for detection (but a low amplitude-resolution) may be achieved and, on the other hand, a high amplitude resolution to measure the reflectivity (but a lower time-resolution and averaging) may be achieved.

BRIEF DESCRIPTION OF THE DRAWINGS

Examples of the disclosure will subsequently be described by the enclosed figures, wherein

FIGS. 9A-9F comprise FIG. 9A schematically showing a multi-bit processing chain and FIGS. 9B-9F showing diagrams showing exemplary signals of the individual processing elements of the multi-processing chain, according to an example;

DETAILED DESCRIPTION

Figure 1:
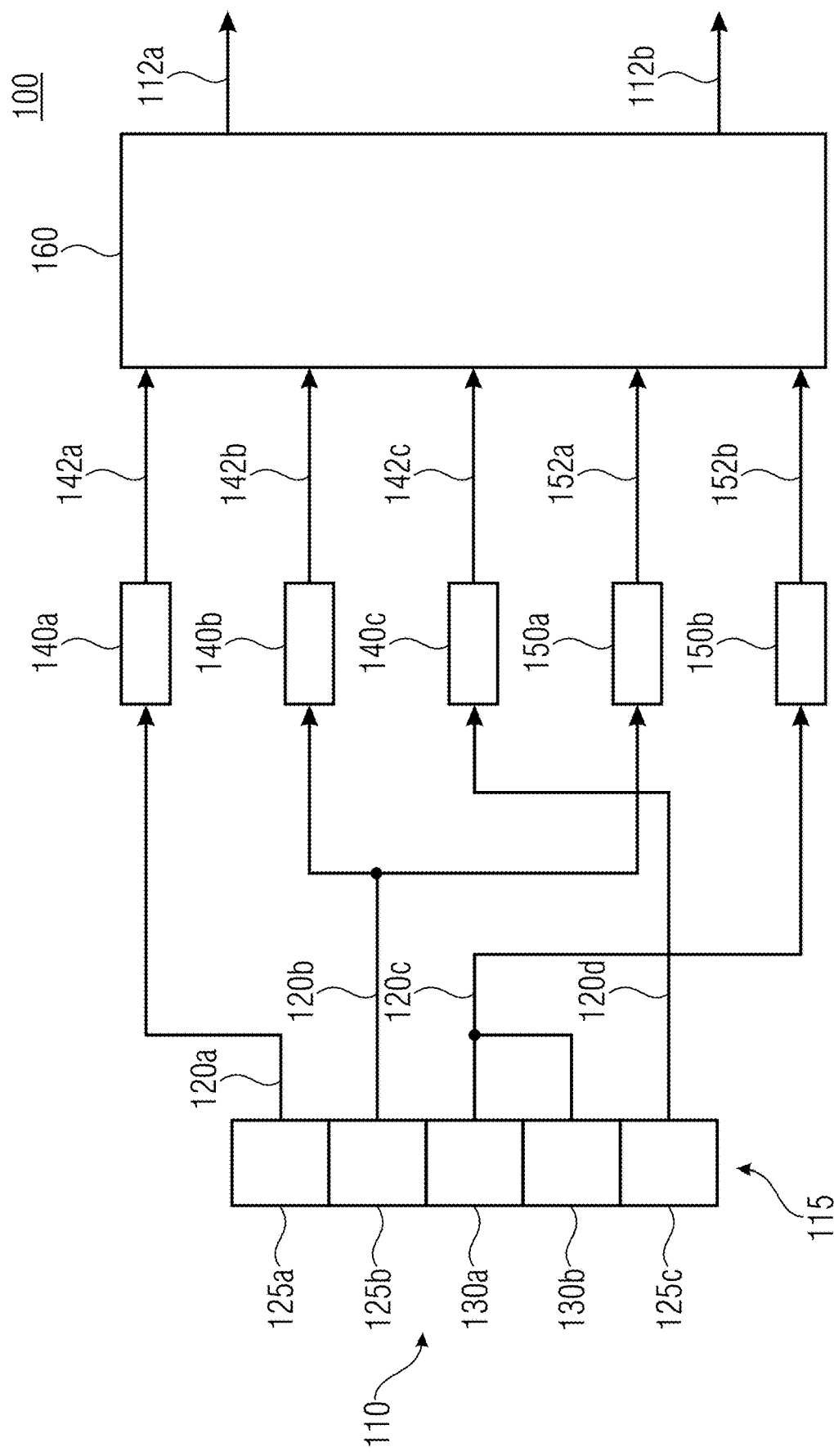
FIG. 1 shows a block schematic diagram of a receiver for a LIDAR system, according to an example.

FIG. 1 shows schematically a receiver 100 for a LIDAR system. The receiver is responsive to a light 110 reflected from an object in the target are of the LIDAR system (not shown) and provides a first parameter 112a of the object and a second parameter 112b of the object. The receiver 100 comprises a plurality of detecting elements 115. Each detecting element provides an analog detection signal 120a, 120b, 120c, 120d in response to receiving a reflected laser pulse 110. The signals 120a, 120b and 120d are provided by a single member 125a, 125b, 125c, respectively, converting the light 110 into an electric signal. The signal 120c is provided by two members 130a and 130b connected (e.g., in parallel) to each other.

The receiver 100 comprises further three first converting elements 140a, 140b, 140c. The converting element 140a provides a first digital detection signal 142a in response to the analog detection signal 120a provided to the converting element 140a; the converting element 140b provides a first digital detection signal 142b in response to the analog detection signal 120b; the converting element 140c provides a first digital detection signal 142c in response to the analog detection signal 120d. The digital detection signals 142a, 142b, 142c have a first resolution, i.e., use a first number of bits to represent the analog detection signals. According to an example, the first resolution may be 1 bit and the converting elements 140a, 140b, 140c may be comparators.

The receiver 100 comprises further two second converting elements 150a, 150b. The converting element 150a provides a second digital detection signal 152a in response to the analog detection signal 120b; the converting element 150b provides a second digital detection signal 152b in response to the analog detection signal 120c. The second converting elements 150a, 150b use a second number of bits to represent the respective analog detection signals. In other words, the second converting elements 150a, 150b have a second resolution. According to an example, the second resolution may be 8 bits and the converting elements 150a, 150b may be multi-bit analog to digital converters.

It is clear that the specific connections between detecting elements and converting elements in FIG. 1 is for illustrative purposes and may vary in other examples. In examples, the receiver may comprise switches, such as multiplexers, which permit selectively switching the output signal of each of the detecting elements 125a, 125b, 125c, 130a, 130b to one of the first converting elements 140a, 140b, 140c, to one of the second converting elements 150a, 150c or to both.

In addition, the receiver 100 comprises a processing module 160. The processing module 160 determines the first parameter 112a of the object in the target area of the LIDAR system using the first digital detection signals 142a, 142b, 142c. Also, the processing module 160 determines the second parameter 112b of the object in the target area of the LIDAR system using the second digital detection signals 152a, 152b. According to an example, the first parameter 112a may be a detection parameter or a ranging parameter and the processing module determines the first parameter using the 1 bit digital detection signals 142a, 142b, 142c. The second parameter 112b may be a reflectivity parameter and it may be determined by the processing module 160 using the 8 bit digital detection signals 152a, 152b.

According to an example of the disclosure, the first converting element may be a comparator using one bit to represent the first digital detection signal and/or the second converting element may be an analog to digital converter using two or more bits to represent the second digital detection signal. This example may advantageously allow for determining certain parameters, such as the detection and ranging, at a low effort in terms of silicon resource and power dissipation by using a comparator and/or for determining certain parameters, such as the reflectivity, at a higher effort with a higher resolution by using an analog to digital converter.

According to an example of the disclosure, the first analog detection signal and the second analog detection signal may be provided by the same one of the plurality of detecting elements. This example may advantageously allow for digitalizing signals provided by the same detecting elements by using two different resolutions, for example, in dependence on the parameter to be determined.

According to an example of the disclosure, a number of the first converting elements may be lower than a number of the plurality of the detecting elements, and the receiver may further comprise at least one first multiplexer coupled to a first subset of detecting elements comprising two or more of the plurality of detecting elements and configured to switch the analog detection signal of one of the detecting elements out of the first subset to the first converting element. This example may advantageously allow for sharing a converting element between the detecting elements instead of having one separate converting element for each detecting element.

According to an example of the disclosure, a number of the second converting elements may be lower than a number of the plurality of the detecting elements, and the receiver may further comprise at least one second multiplexer coupled to a second subset of detecting elements comprising two or more of the plurality of detecting elements and configured to switch the analog detection signal of one of the detecting elements out of the second subset to the second converting element. This example may advantageously allow for sharing a converting element between the detecting elements instead of having one separate converting element for each detecting element.

According to an example of the disclosure, the first subset of detecting elements and the second subset of detecting elements may comprise the same ones of the plurality of detecting elements. This example may advantageously allow for digitalizing signals provided by the same detecting elements by using two different resolutions, for example, in dependence on the parameter to be determined According to an example of the disclosure, the second multiplexer may be configured to, for each laser pulse of a plurality of laser pulses emitted during a measurement period to a location in the target area, switch the analog detection signal of a different one of the detecting elements to which the second multiplexer is coupled to the second converting element. This example may advantageously allow for sharing a converting element between the detecting elements.

According to an example of the disclosure, the first multiplexer may be configured to, for each laser pulse of a plurality of laser pulses emitted during a measurement period to a location in the target area, switch the analog detection signal of a selected one or selected ones of the detecting elements to which the first multiplexer is coupled to the first converting element. This example may advantageously allow for flexibly sharing the first converting element between the detecting elements.

According to an example of the disclosure, the second multiplexer may be configured to, for each laser pulse of a plurality of laser pulses emitted during a measurement period to a location in the target area, switch the analog detection signal of a selected one or selected ones of the detecting elements to which the second multiplexer is coupled to the second converting element. This example may advantageously allow for flexibly sharing the second converting element between the detecting elements.

According to an example of the disclosure, the receiver may further comprise a selection module configured to select the selected one or selected ones of the detecting elements to be switched by the first multiplexer and/or for the second multiplexer using a region of interest in the target area of the LIDAR system. This example may advantageously allow for focusing the available converting elements to a selected region in the target area.

According to an example of the disclosure, the selection module may be configured to determine the region of interest using previous ones of the first and/or second digital detection signals. This example may advantageously allow for using available knowledge about the target area acquired in the past to determine the region of interest.

According to an example of the disclosure, the processing module may be configured to use an average of the first digital detection signals and/or the second digital detection signals of the selected ones of the detecting elements obtained for the plurality of laser pulses emitted during the measurement period to the location in the target area. This example may advantageously allow for using the available detecting elements for averaging which may result in improving signal to noise ratio.

According to an example of the disclosure, the plurality of laser pulses emitted during the measurement period may comprise two or more or all laser pulses emitted for a single angle setting of the LIDAR system. This example may advantageously allow for using any advantages described herein, such as multiplexing, averaging, for a single spatial setting of a LIDAR system.

According to an example of the disclosure, the second multiplexer may be configured to, during a measurement duration associated with a single laser pulse emitted to a location in the target area, switch the analog detection signal of selected ones of the detecting elements to which the second multiplexer is coupled to the second converting element. This example may advantageously allow for enhanced multiplexing and sharing a converting element between the detecting elements at a fine time granularity.

According to an example of the disclosure, the receiver may further comprise a selection module configured to select the selected ones of the detecting elements using previous ones of the first and/or second digital detection signals, and/or the first digital detection signal, and/or a number of the second converting elements. This example may advantageously allow for using available knowledge about the target area from the past, the current measurement performed at a lower resolution and information about available detecting elements having a higher resolution for decisions with regard to the multiplexing.

According to an example of the disclosure, the second parameter may be a reflectivity parameter, and the processing module may be configured to use the first digital detection signal in the determining the reflectivity parameter. This example may advantageously allow for enhancing the determining of the reflectivity parameter by using information obtained at a lower resolution, for example, about location of potentially reflecting objects.

According to an example of the disclosure, the first parameter may be a detection parameter and/or a ranging parameter, and the processing module may be configured to use the second digital detection signal in the determining the detection parameter and/or the ranging parameter. This example may advantageously allow for enhancing the determining of the detection parameter and/or the ranging parameter by using information obtained at a higher resolution converting elements.

According to an example of the disclosure, the receiver may further comprise at least one analog low-pass filters upstream the second converting element, the analog low-pass filter configured to low-pass filter the second analog detection signal before supplying the second analog detection signal to the second converting element. This example may advantageously allow for reducing noise floor and/or sampling frequency for the second converting element.

According to an example of the disclosure, the processing module may be configured to at least partially compensate for a modification in the second digital detection signal of the second converting element introduced by the analog low-pass filter by using an inverted transfer function of the analog low-pass filter. This example may advantageously allow for reducing the impact of the low-pass filter on the determined parameter.

According to an example of the disclosure, the receiver may further comprise at least one digital low-pass filters downstream the second converting element, the digital low-pass filter configured to low-pass filter the second digital detection signal provided by the second converting element. This example may advantageously allow for reducing noise for determining the second parameter.

According to an example of the disclosure, the processing module may be configured to at least partially compensate for a modification in the second digital detection signal of the second converting element introduced by the digital low-pass filter by using an inverted transfer function of the digital low-pass filter. This example may advantageously allow for reducing the impact of the low-pass filter on the determined parameter. In examples, the processing module may be configured to at least partially compensate for the delay introduced by the digital low-pass filter merely.

According to an example of the disclosure, a sampling rate of the first converting element may be higher than a sampling rate of the second converting element. This example may advantageously allow for saving resources such as silicon resource and/or computational power.

According to an example of the disclosure, the processing module may be configured to use an average of the first digital detection signals obtained for a plurality of laser pulses emitted during a measurement period to a location in the target area. This example may advantageously allow for improving signal to noise ratio and/or enabling detection of peaks in signals digitalized with a low number of bits.

Figure 2:
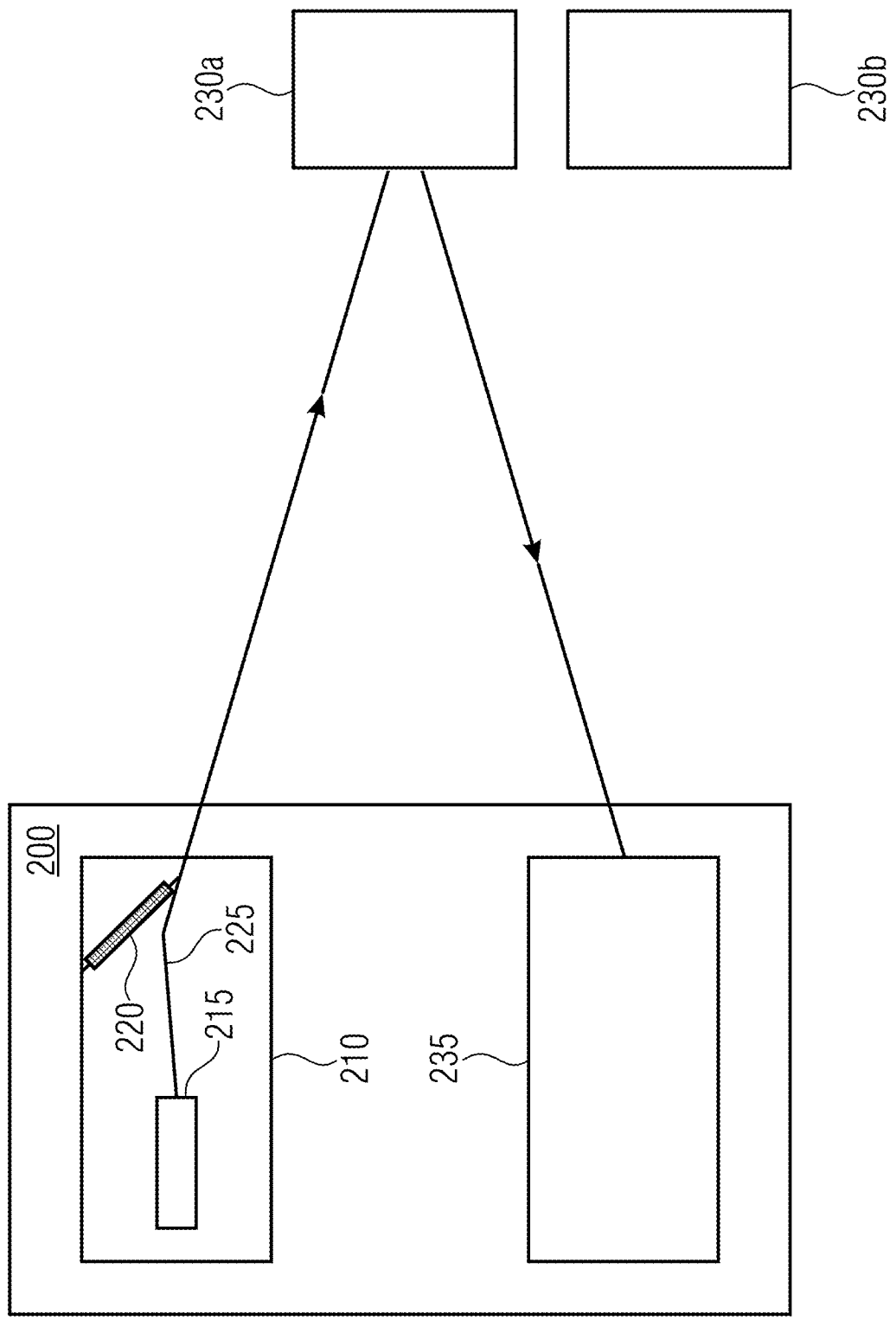
FIG. 2 shows a block schematic diagram of a LIDAR system, according to an example.

FIG. 2 shows schematically a LIDAR system 200. The LIDAR system 200 comprises a transmitter 210 with a laser 215 and a deflector 220. The deflector 220 deflects the laser beam 225 of the laser 215 towards different locations 230a, 230b in the target area of the LIDAR system 200. The laser beam 225 is reflected by one or more objects in the different locations 230a, 230b in the target are of the LIDAR system 200. A receiver 235 comprised in the LIDAR system 200 obtains the reflected laser beam 225. The receiver 235 may comprise any of the features, functionalities and details described herein. The features, functionalities and details may be used individually or taken in combination to define the receiver of the LIDAR system.

Figure 3:
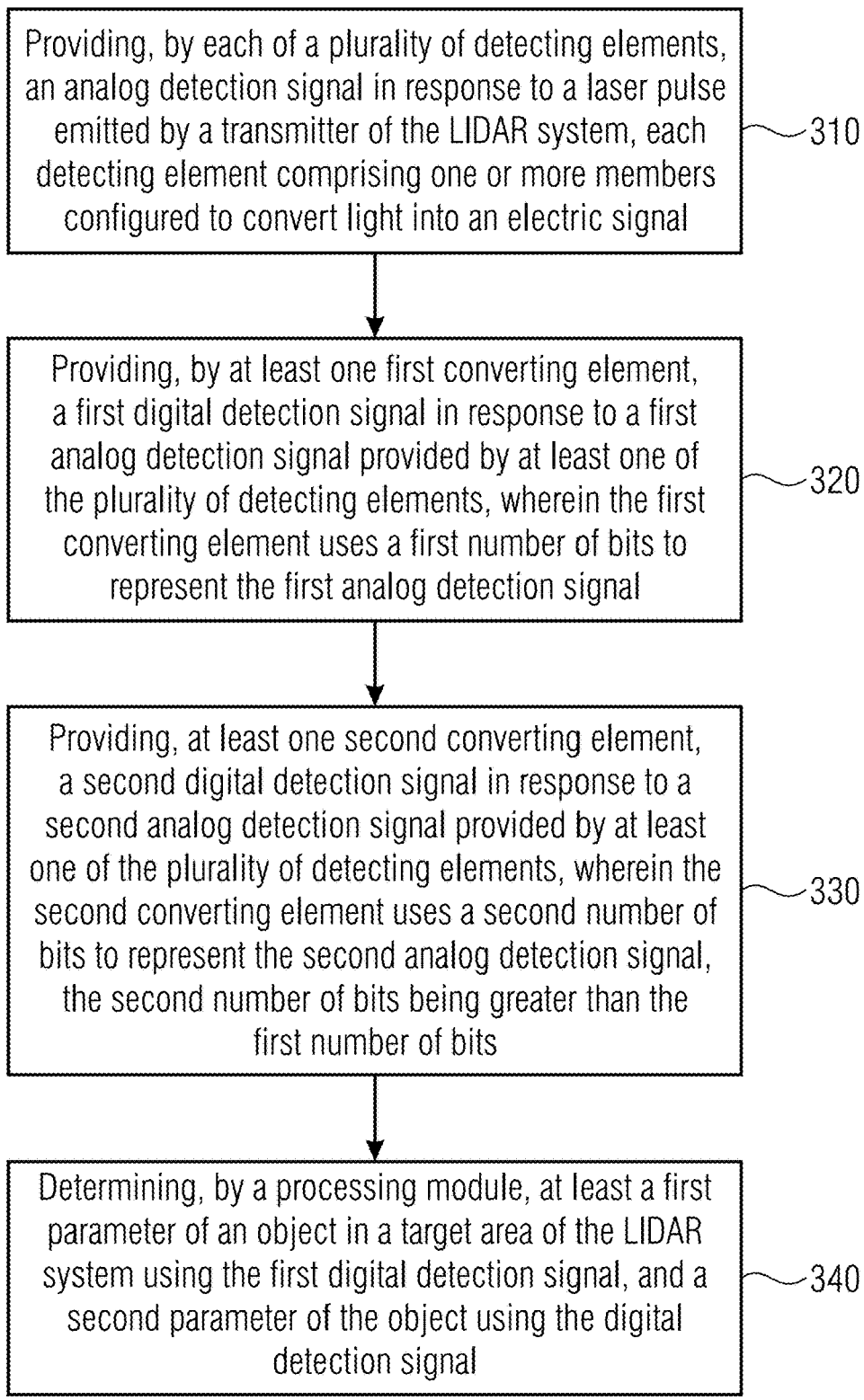
FIG. 3 shows a flow chart of a method for operating a receiver for a LIDAR system, according to an example.

FIG. 3 shows a flow chart of a method 300 for operating a receiver for a LIDAR system. The method 300 comprises the step 310 of providing, by each of a plurality of detecting elements, an analog detection signal in response to a laser pulse emitted by a transmitter of the LIDAR system, each detecting element comprising one or more members configured to convert light into an electric signal. Further, the method 300 comprises the step 320 of providing, by at least one first converting element, a first digital detection signal in response to a first analog detection signal provided by at least one of the plurality of detecting elements, wherein the first converting element uses a first number of bits to represent the first analog detection signal. The method 300 comprises also the step 330 of providing, at least one second converting element, a second digital detection signal in response to a second analog detection signal provided by at least one of the plurality of detecting elements, wherein the second converting element uses a second number of bits to represent the second analog detection signal, the second number of bits being greater than the first number of bits. In addition, the method 300 comprises the step 340 of determining, by a processing module, at least a first parameter of an object in a target area of the LIDAR system using the first digital detection signal, and a second parameter of the object using the digital detection signal.

The method 300 may optionally be supplemented by any of the features, functionalities and details disclosed herein, also with respect to the apparatuses. The method 300 may optionally be supplemented by such features, functionalities and details both individually and taken in combination.

Figure 4:
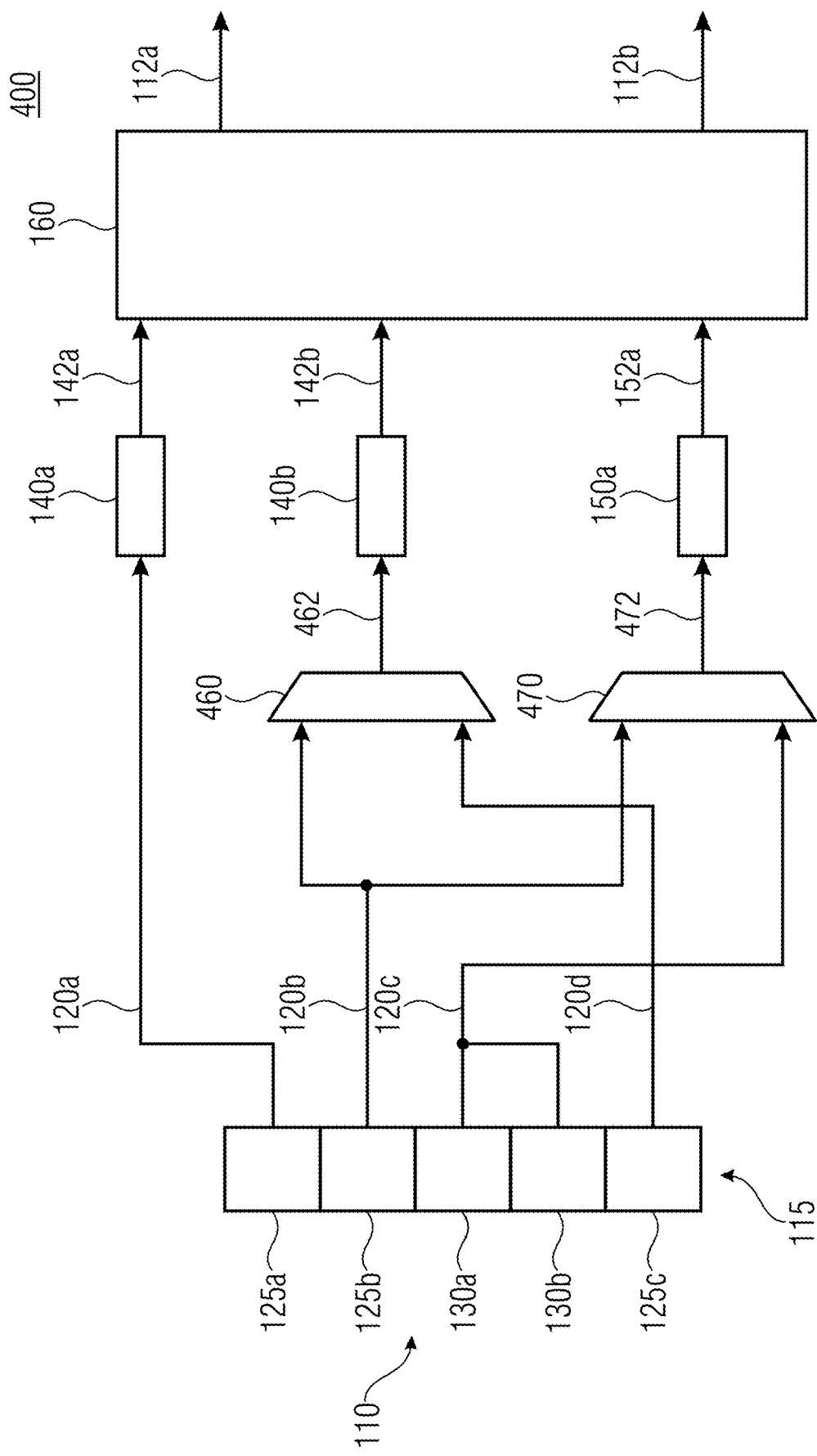
FIG. 4 shows a block schematic diagram of a receiver for a LIDAR system, according to an example.

FIG. 4 shows schematically a receiver 400 for a LIDAR system. The receiver 400 comprises several elements which are described in conjunction with FIG. 1 above. Those elements of the receiver already described above have associated the same reference signs and are not described again.

The receiver 400 comprises a first multiplexer 460. The first multiplexer 460 is coupled to a subset of the detecting elements, namely to those detecting elements providing the first analog detection signals 120b and 120d. The first multiplexer 460 provides an output signal 462 which is provided to the first converting element 140b. The first multiplexer 460 selectively switches one of the signals 120b and 120d to the converting element 140b.

In addition, the receiver 400 comprises a second multiplexer 470 which is coupled to a subset of the detecting elements, namely to those providing the second analog detection signals 120b and 120c. The second multiplexer 470 provides an output signal 472 which is provided to the second converting element 150a. The second multiplexer 470 selectively switches one of the signals 120b and 120c to the converting element 150a.

It is clear that the specific connections between detecting elements, multiplexers and converting elements in FIG. 4 is for illustrative purposes and may vary in other examples. Generally, in examples, multiplexers may be provided that permit selectively switching the analog detection signal of each of the detecting elements to either a first analog to digital converter having the first resolution or a second analog to digital converter having the second resolution or both.

Figure 5:
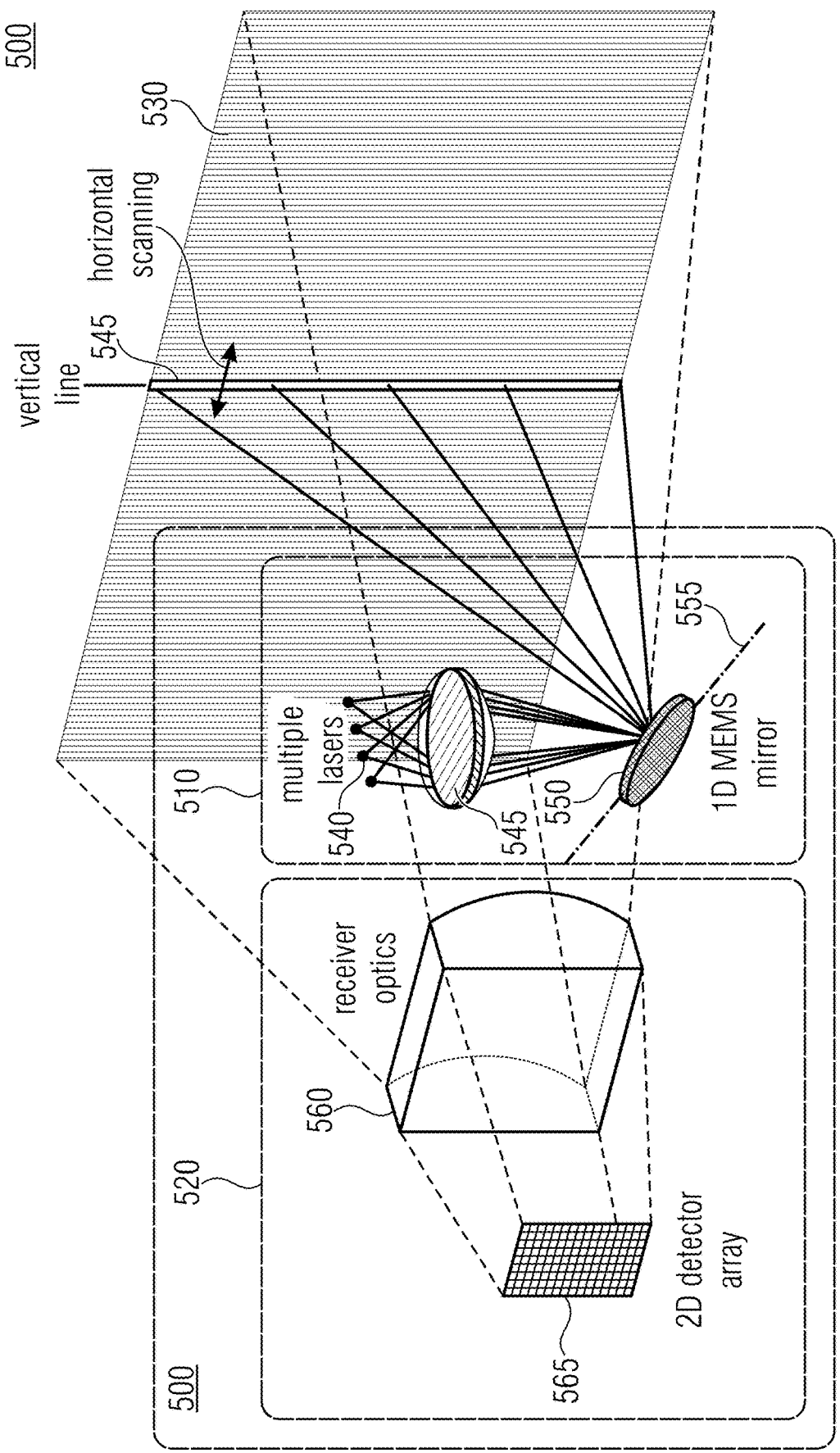
FIG. 5 shows a 1D scanning LIDAR system, according to an example.

FIG. 5 shows an exemplary 1D scanning LIDAR system 500. The system 500 comprises a transmitter 510 and a receiver 520. The transmitter 510 illuminates a portion of the scenery 530 with a laser beam 535 (e.g., a vertical laser beam). In an example, the laser beam 535 may have a wavelength of 905 nm. The reflected laser beam 535 reflected by objects in the scenery 530 is obtained at the receiver 520 and processed to obtain a digital representation of the scenery 530.

The transmitter 510 comprises a plurality of bar lasers 540. The individual beams of the lasers 540 are focused by a lens system 545 and deflected by a 1D MEMS mirror 550, which is an example of a deflector. The transmitter is controlled by a controller (not shown) which effectuates the 1D MEMS mirror 550 to oscillate and assume different angular positions with regard to the axis 555 such that the scenery 530 is scanned (e.g., horizontally). The lasers 540 are controlled by a controller (not shown) such that pulsed laser beams 535 illuminate the scenery 530. According to an example, an individual pulse of the lasers may have the duration in the order of a few nanoseconds, e.g., 10 ns.

The receiver 520 comprises optics 560 and a 2D detector array 565. The optics 560 focusses the light reflected from the scenery 530 on the 2D detector array 565. The 2D detector array 565 converts the received light into electrical signals. The 2D detector array 565 along with analog circuitry such as filters, amplifiers and the like is an example of detecting elements of the present invention. The detector array 565 may comprise a plurality of avalanche photodiodes, which may also be referred to as APD, and which may be arranged in a 2D array. Different individual elements of the 2D array along the vertical direction, i.e., in the direction in which the vertical laser beams 535 extend, correspond to different vertical locations in the scenery 530 (i.e., different fields of view). Different individual elements of the 2D array 565 along the horizontal direction (i.e., different columns) are used for different ranges of the angular position of the mirror 550, i.e., for different horizontal sections of the scenery 530.

The 2D detector array 565 is connected to a processing module (not shown). The processing module obtains the electrical signals provided by the 2D detector array 565 and uses analog and digital signal and data processing in order to provide a digital representation of the scenery 530. The digital representation of the scenery contains a plurality of points, to which parameters such as detection, ranging and reflectivity may be assigned. More specifically, for an individual angular position of the mirror 550, a laser pulse is emitted and the electrical signals provided by the 2D detector array 565 are captured and sampled for a predetermined period of time in order to obtain light reflected by the objects in the target area. According to an example, the capture time may have the duration in the order of a few microseconds, e.g., 2 μs. The digital representation of the electrical signals provided by the 2D detector array 565 undergoes digital signal processing which may include averaging and matching with a threshold.

Figure 6:
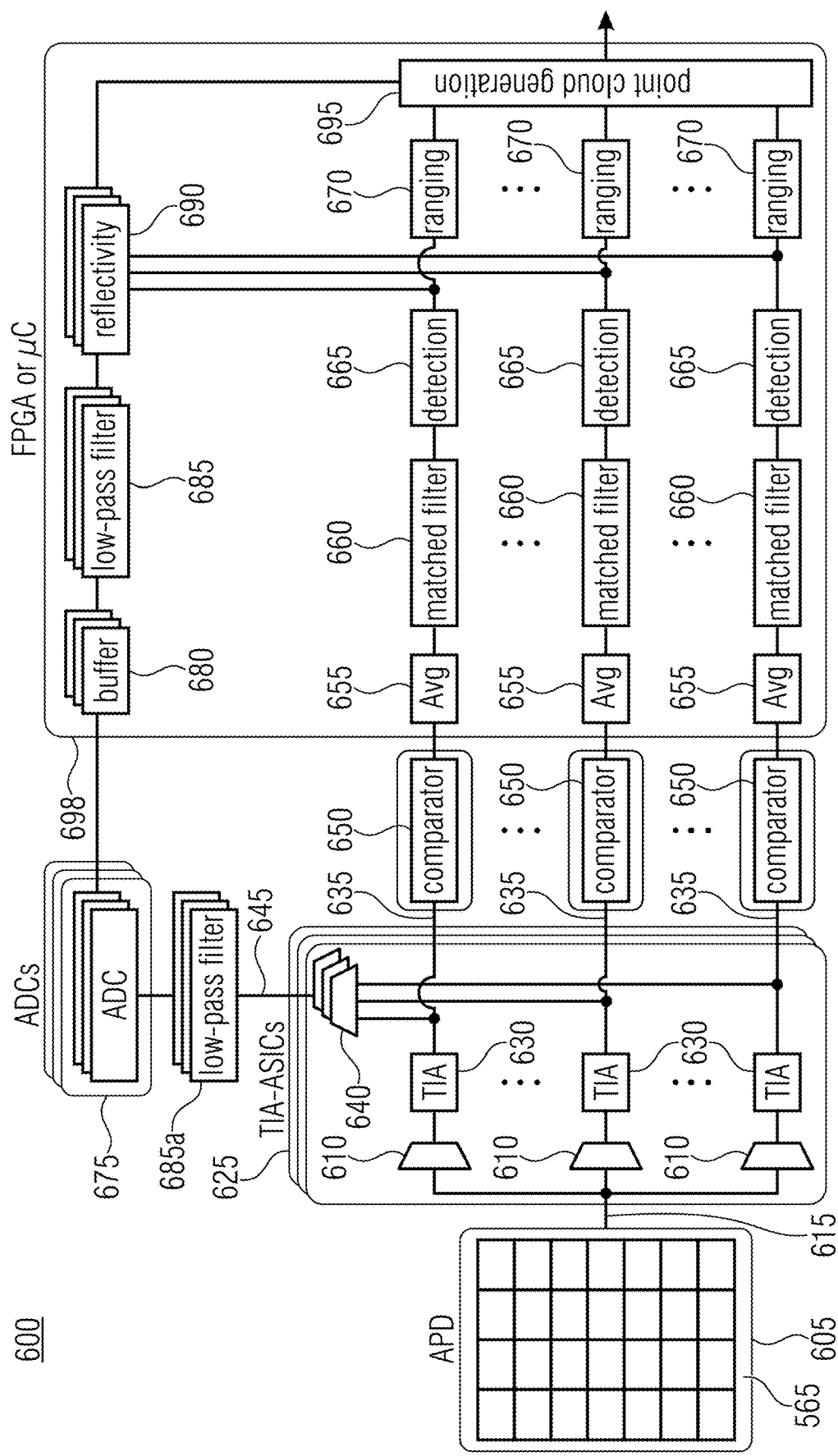
FIG. 6 shows a receiver of a LIDAR system, according to an example.

FIG. 6 shows an example of the receiver of the LIDAR system 500 described in conjunction with FIG. 5. It is noted that those elements of the receiver 520 already described above have associated the same reference signs and are not described again.

The receiver 600 shown in FIG. 6 comprises an analog part 605 with a 2D detector array 565 and outputs 615. Elements of the 2D detector array are connected to the outputs 615. Transimpedance amplifier (TIA) application-specific integrated circuits (ASICs) comprise multiplexers 610, TIA channels 630 and multiplexers 640. The elements of the array 565 are connected to the multiplexers 610 via outputs 615 such that a multiplexing between the elements of the array 565 and the TIA channels 630 may be effectuated. The outputs 615 of the analog part 605 are connected to inputs of the TIA ASICs 625, respectively, each comprising a plurality of TIA channels 630. The TIA channels 630 provide a voltage which corresponds, e.g., is proportional, to the current provided to the TIA channels 630 by the elements of the array 565. The outputs of the TIA channels 630 are provided to outputs 635 of the TIA ASICs 625. The outputs of the TIA channels 630 are also provided to the multiplexers 640. Outputs of the multiplexers 640 are provided to outputs 645 of the TIA ASICs 625.

The outputs 635 of the TIA ASICs 625 are provided to comparators 650. Each comparator 650 converts an input signal provided to it into a 1-bit digital representation of the input signal. More specifically, each comparator 650 compares its input to a threshold and provides a digital output signal having, for example, a value of 1, if the input is greater than or equal to the threshold, and provides a different digital output signal having, for example, a value of 0, if the input is lower than the threshold. The digital signals provided by the comparators 650 are processed by 1-bit processing chains, each comprising an averaging element 655, a matched filter element 660, a detection element 665 and a ranging element 670. A 1-bit processing channel corresponds to a vertical field of view (FoV) for a horizontal 1D scanning LIDAR system, however, a vertical 1D scanning LIDAR system is also envisaged. The operation of the 1-bit processing chain is described in conjunction with FIG. 8 below.

The outputs 645 of the TIA ASICs 625 are provided to analog to digital converters (ADC) 675, respectively. Each ADC 675 converts an input signal provided to it into a multi-bit representation of the input signal. The number of bits used to represent of input signal, i.e., the number of output bits of an ADC, is also referred to as the resolution of the ADC. According to an example, the ADCs 675 may have a resolution of 8 bits. The digital signals provided by the ADCs 675 are processed by ADC processing chains, each comprising a buffer element 680, a low-pass element 685 and a reflectivity element 690. Low-pass elements 685a may be optionally provided in addition (or as an alternative to the low-pass elements 685). The operation of the multi-bit processing chain is described in conjunction with FIG. 9 and FIG. 10 below.

The multi-bit processing chain and the 1-bit processing chain may be optionally connected to each other. In an example, the reflectivity element 690 may be optionally provided with the output of the detection elements 665. In this example, by knowing when a reflection was detected allows for reducing the bandwidth of the reflectivity measurements, which improves the signal to noise ratio and accuracy of the reflectivity measurement. The knowledge when a reflection was detected may be based on histogramming in the 1-bit chain, for example, in the detection element 665.

In another example, the multi-bit data may be considered for the detection and/or ranging, for example, in the detection elements 665 and/or in the ranging elements 670. The data from the 1-bit path and the multi-bit path may be combined (merged), for example, after averaging. In an example, data considered for ranging/detection may be defined as avg(1 bit data)+weight*(multi-bit data), wherein avg( ) refers to an averaging operation, weight is a predetermined or dynamic weighting coefficient, and multi-bit data refer to ADC data or any other data in the multi-bit processing chain.

The outputs of the ranging elements 670 and the reflectivity elements 690 are provided to a point cloud generation element 695. The elements 655, 660, 665, 670, 680, 685, 690 and 695 collectively (or individually) may be referred to as a processing module 698. The digital signal processing elements such 655, 660, 665, 670, 680, 685, 690 and 695 of FIG. 6 may be implemented in a Field-Programmable Gate Array (FPGA) or a microcontroller (μC). However, it is understood that different implementations for each of the elements 655, 660, 665, 670, 680, 685, 690 and 695, for example, in an ASIC or in a signal processor are envisaged.

While 1-bit digital to analog conversion is used in the processing chain of FIG. 6 comprising the detection and ranging elements 665, 670, a different number of bits may be used to digitalize the output signals 635. Nevertheless, it is generally advantageous to use a lower number of bits for the processing chains comprising the detection and ranging elements 665, 670 relative to the number of bits for the processing chains comprising the reflectivity elements 690: An analog to digital conversion having a lower number of bits uses less resources, for example, consumes less power, uses less silicon area, etc. and may still allow for determining the desired parameters such as detection/ranging.

In FIG. 6, three overlapping blocks indicate that one or more corresponding blocks may be used. The multiplexer in the TIA ASIC(s) may be split into subsections. The components may be distributed differently over integrated circuits. With respect to the low pass filters 685 and 685a are optional, i.e., in a real case scenario either low pass filter 685 or low pass filter 685a, but not both, will be provided.

Figure 7:
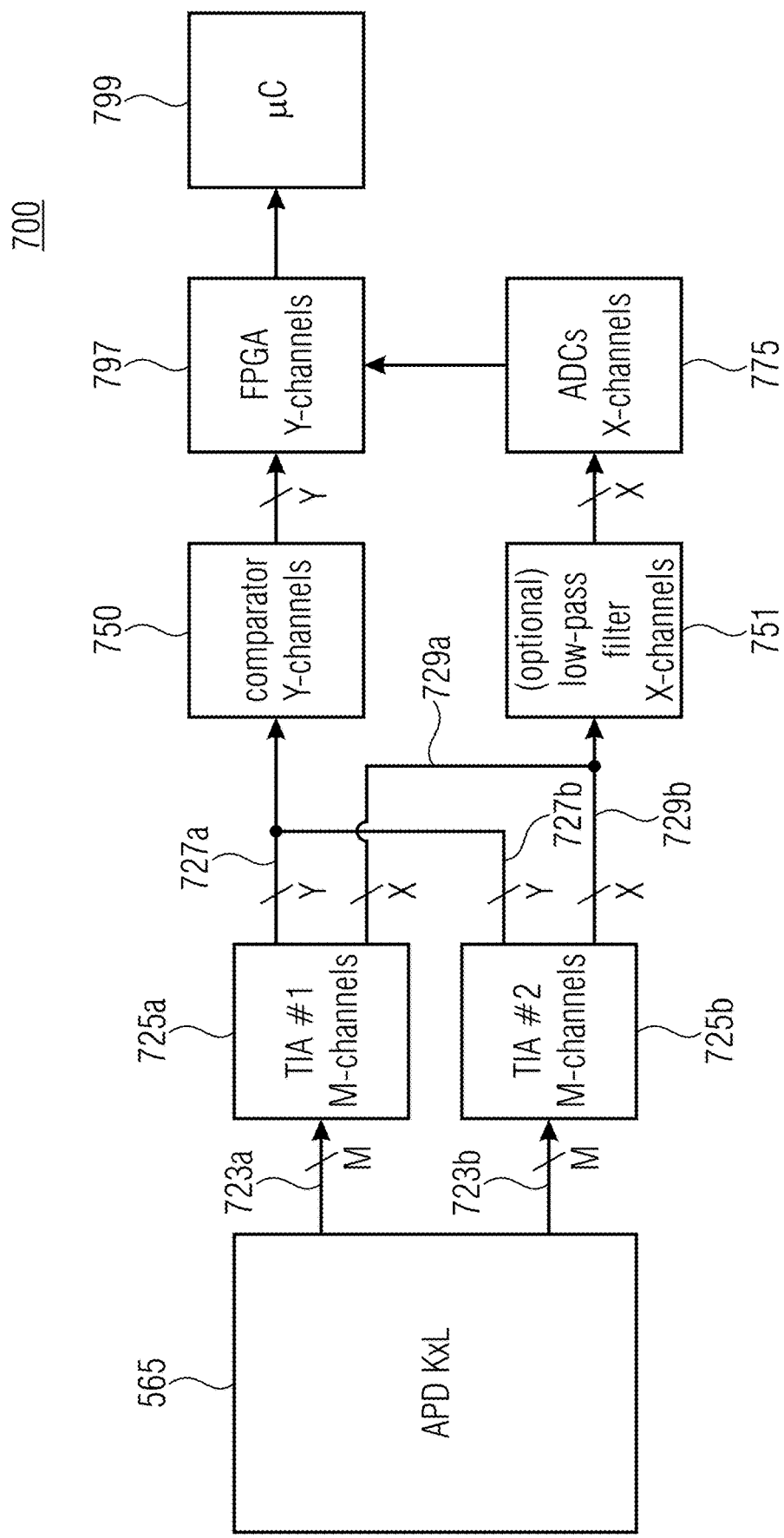
FIG. 7 shows a different example of a receiver of a LIDAR system.

FIG. 7 shows a different example of the receiver of the LIDAR system 500 described in conjunction with FIG. 5. It is noted that those elements of the receiver already described above on conjunction with FIGS. 5 and 6 have associated the same reference signs and are not described again. According to FIG. 7, a receiver 700 comprises Y first converters 750 having a lower resolution and X second converters 775 having a higher resolution, wherein Y and X are positive integers. Generally, Y may be larger than X. First converters may be comparators having a resolution of 1 bit and converters 775 may be ADCs having a resolution of 8 bit.

The receiver 700 shown in FIG. 7 comprises a 2D detector array 565, which may comprise K×L detector elements. The signals of the each plurality of M elements of the array 565 are provided to one of circuits 725*a*, 725*b*, for example, ASICs, each comprising a plurality of M TIA channels. Each of the circuits 725*a*, 725*b* comprises a first multiplexer such that Y out of M input signals 723*a*, 723*b* are switched to the Y output signals 727*a*, 727*b*, respectively. The Y signals 727*a*, the Y signals 727*b* (or both) are then provided to Y comparator channels 750 which correspond to the 1-bit comparator 650 in FIG. 6. Circuits 725*a*, 725*b* may provide multiplexing to the outputs 727*a* and 727*b*.

Each of the circuits 725*a*, 725*b* also comprises a second multiplexer such that X out of the M input signals 723*a*, 723*b* are switched to the X output signals 729*a*, 729*b*, respectively. Both signals 729*a*, 729*b* may be low pass filtered in a low-pass filter element 751 and provided to X ADC channels, which correspond to the ADCs 675 in FIG. 6.

The outputs of the Y channel comparator block 750 and the X channel ADC block 775 are provided to an FPGA 797 having respective digital signal processing (DSP) channels. The output of the FPGA 797 is provided to a microcontroller 799. The FPGA 797 and the microcontroller 799 may individually or jointly implement the functionalities described in conjunction with the blocks 655, 660, 665, 670, 680, 685, 690 and 695 in FIG. 6 above.

Figure 8A:
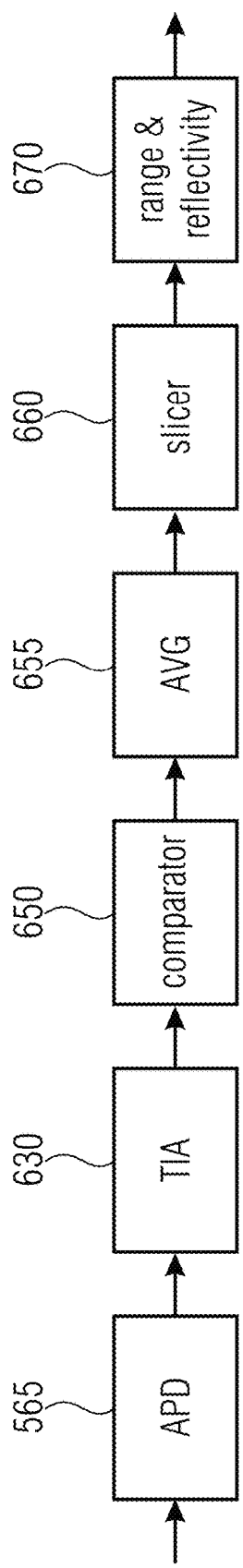
FIGS. 8A-8F comprise FIG. 8A schematically showing a 1-bit processing chain and FIGS. 8B-8F showing diagrams depicting exemplary signals within the 1-bit processing chain, according to an example.

FIG. 8 comprises FIG. 8A schematically showing a 1-bit processing chain of a single channel and FIGS. 8B-8F showing diagrams depicting exemplary signals within the 1-bit processing chain. It is noted that those elements of the receiver already described above in conjunction with FIGS. 5 to 7 have associated the same reference signs and are not described again.

The processing chain shown in FIG. 8A comprises an APD 565, a TIA 630, a comparator 650, an averaging element 655, a matched filter/slicer element 660 and a ranging/reflectivity element 670. The averaging element 655 is configured to calculate an average resulting from the analog detection signals received in response to a plurality of laser pulses or shots emitted in the measurement period.

Figure 8B:
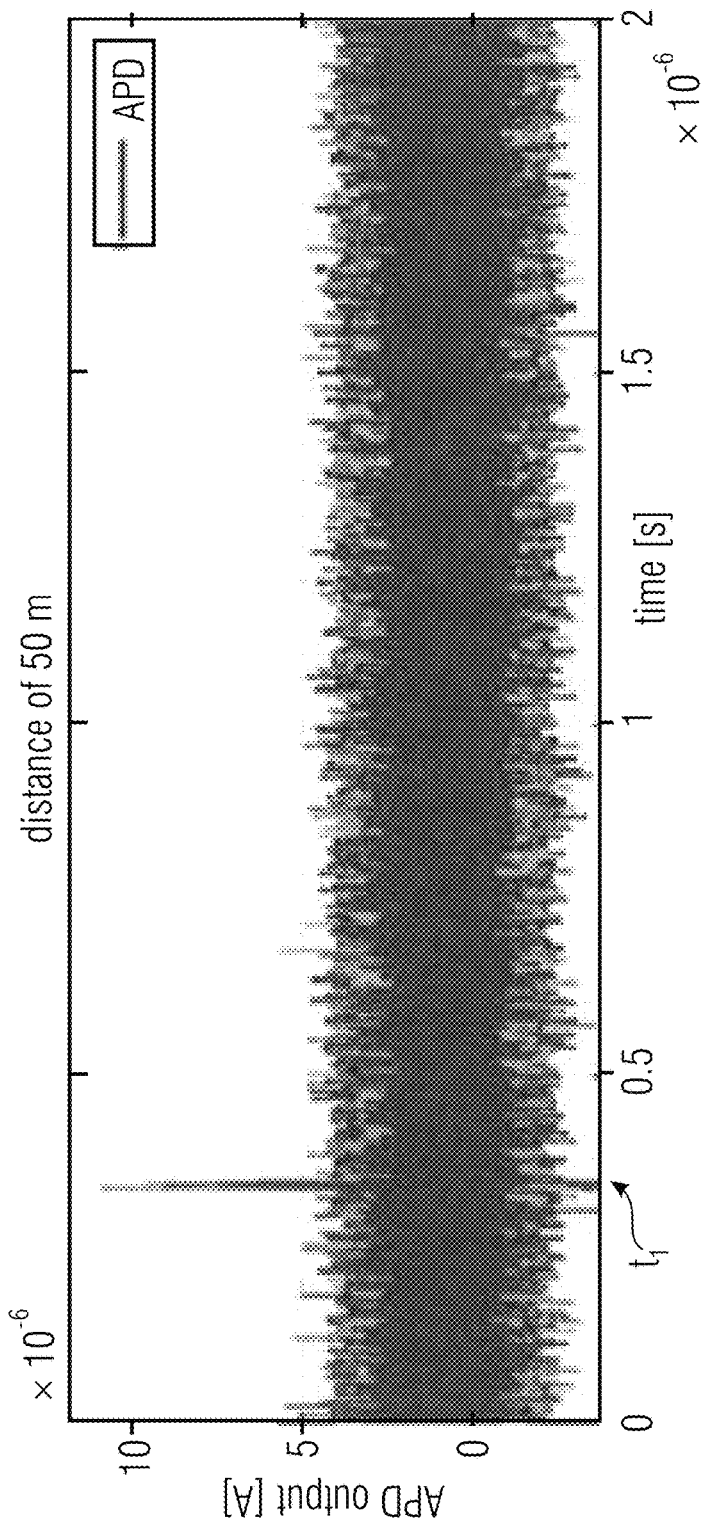

FIG. 8B shows a plurality of waveforms, each illustrating an output current of an element of the APD 565. The waveforms extend from the time instant 0 up to the time instant 2 μs, which corresponds to the capture time of the LIDAR system discussed in conjunction with FIG. 5. A noise floor is visible between approximately the lowest shown ordinate and the current of 5 μA. At an instant of time denoted as ti, a peak having a current of approximately 11 μA is visible. Each waveform shows one of the multiple measurements taken for an individual angular position of the mirror 550 shown in FIG. 5.

Figure 8C:
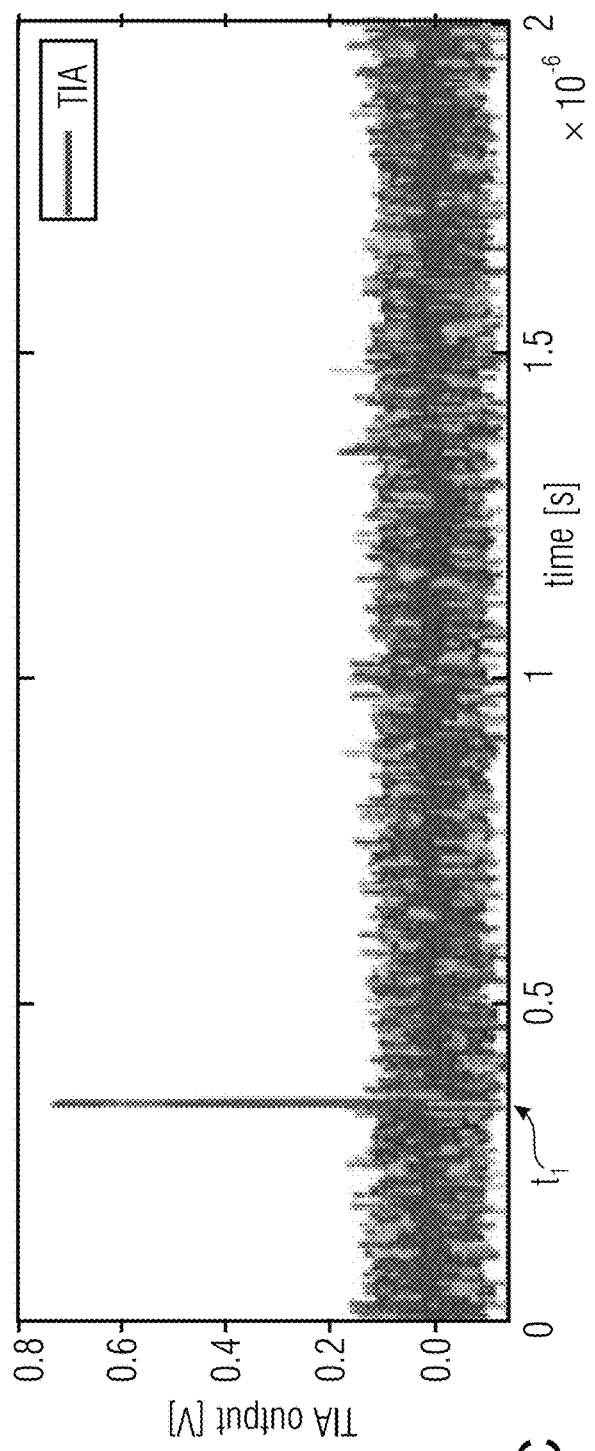

FIG. 8C shows a plurality of waveforms for the measurements for the individual angular position of the mirror 550, each waveform of FIG. 8C corresponds to one waveform in FIG. 8B. Each waveform shows the output voltage of the TIA 630. Similar to the waveforms shown in FIG. 8B, the waveforms shown in FIG. 8C exhibit a noise floor between approximately the lowest shown ordinate and the voltage of slightly below 0.2 V. The peak at the instant of time ti has the value of approximately 0.7 V.

Figure 8D:
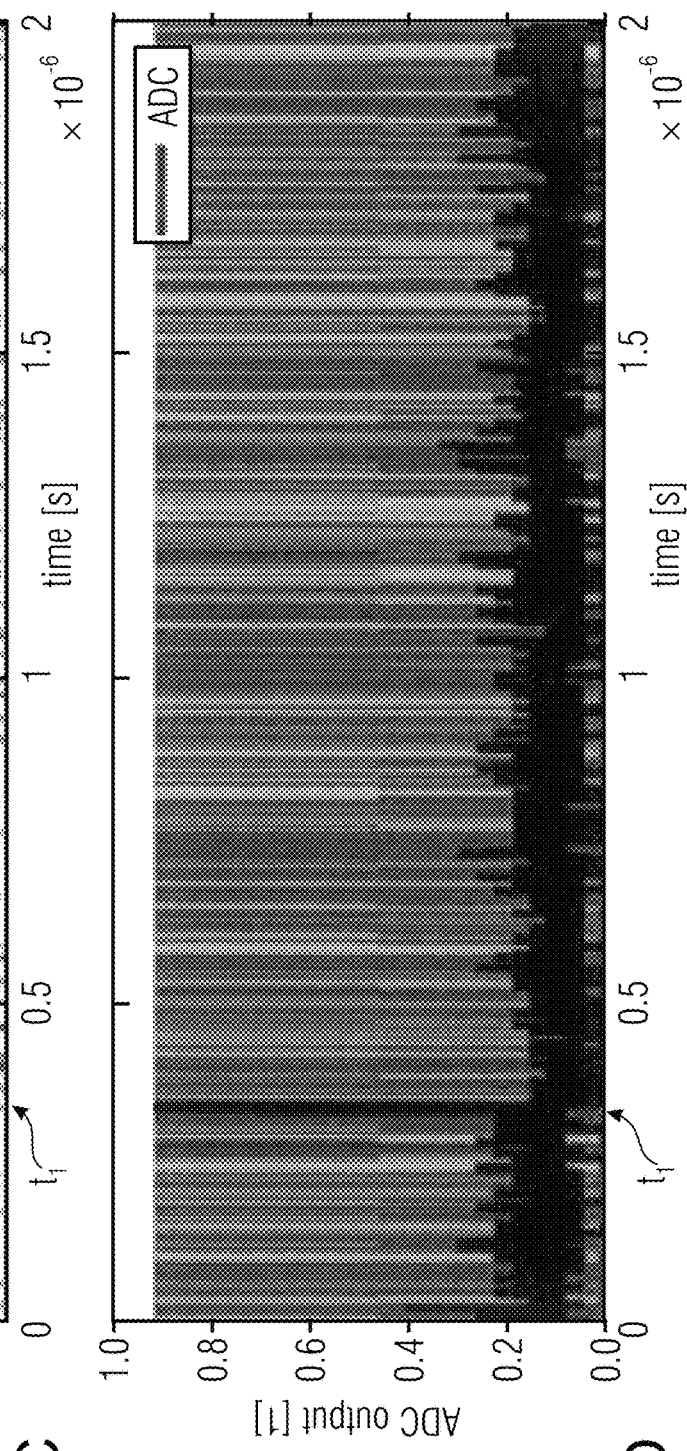

FIG. 8D shows a plurality of waveforms for the measurements for the individual angular position of the mirror 550, each waveform of FIG. 8D corresponds to one waveform in FIGS. 8B and 8C. FIG. 8D shows the output of the comparator 650. Since the comparator 650 is a 1-bit comparator, the output of the comparator 650 assumes only values 0 or 1. At the instant of time ti, a change of the behavior of the waveforms due to the averaging is visible.

Figure 8E:
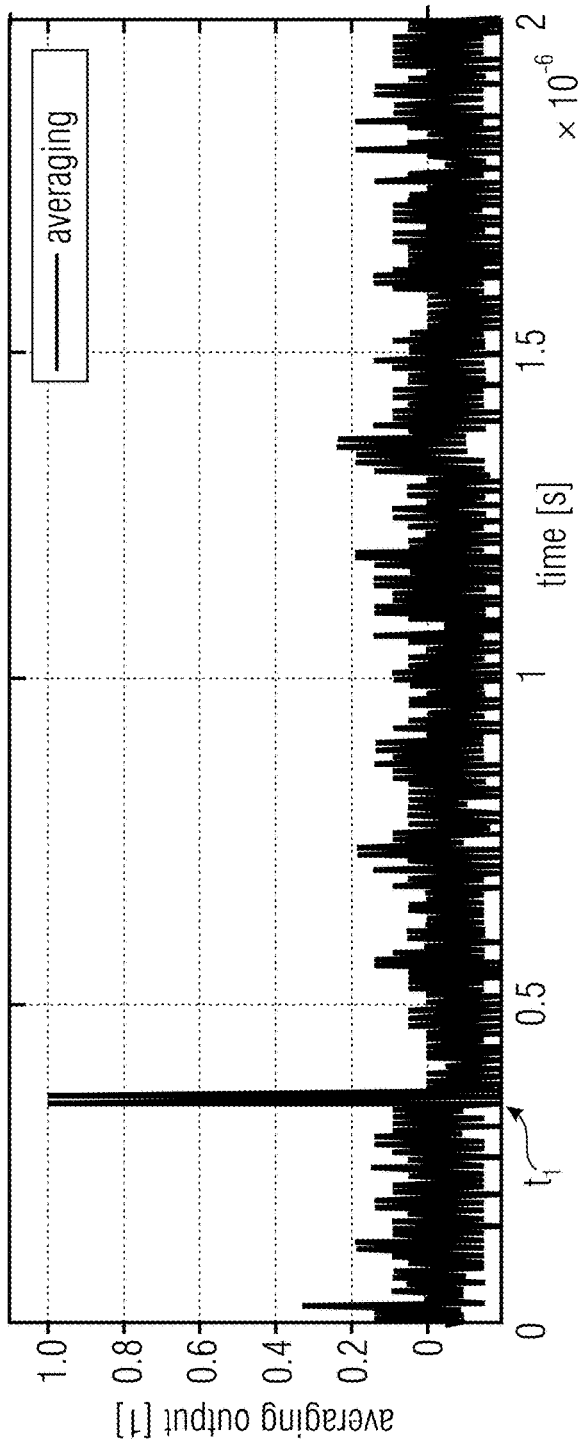
Figure 8F:
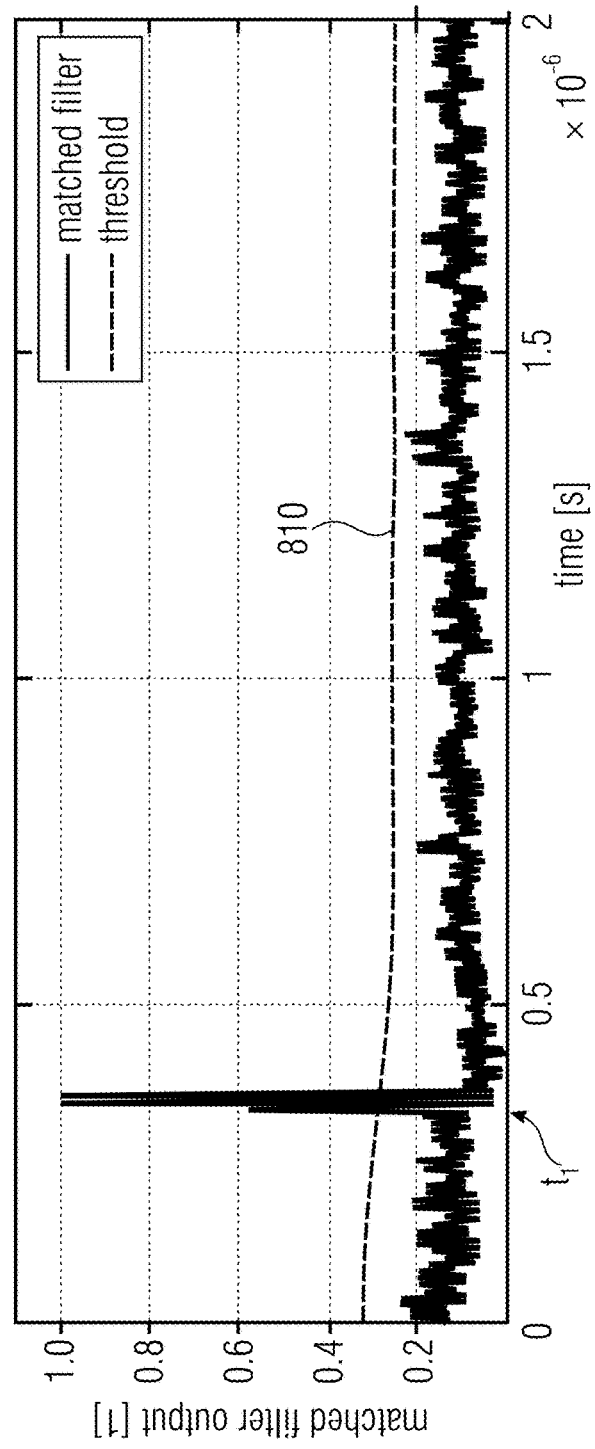

FIG. 8E shows a waveform being an output of the comparator 650 after the averaging in the block 655. Again, the peak at the instant of time ti is visible. FIG. 8F shows the waveform of FIG. 8E after filtering in the matched filter/slicer element 660. FIG. 8E shows in addition a threshold line 810 to which the waveform of FIG. 8F is compared in order to detect the ranging parameter, i.e., a distance from the LIDAR system to an object in the target area of the LIDAR system.

The peak having a value of approximately 1 is delimited from the noise floor in the element 660 and/or 670 by using the threshold line 810. The time instant ti of the peak being approximately 0.35 μs is the time between the emission of the laser pulse by the transmitter 510 of the LIDAR system 500 and the detection of the reflected laser pulse by the receiver of the LIDAR system 500. That time corresponds to a distance travelled by the light at the light speed of approximately 100 m. The detected distance between an objection and the LIDAR system equates, therefore, to approximately 50 m.

Determining the detection and/or ranging parameter by using a 1-bit processing chain may be advantageous relative to using a multi-bit processing chain. The 1-bit processing chain uses less resources, such as silicon resources (e.g., FPGA resources), and power dissipation relative to a multi-bit processing chain. In addition, the performance in determining the detection and/or ranging by using the 1-bit processing chain is typically only insignificantly deteriorated relative to the performance when a multi-bit processing chain is used.

Figure 9A:
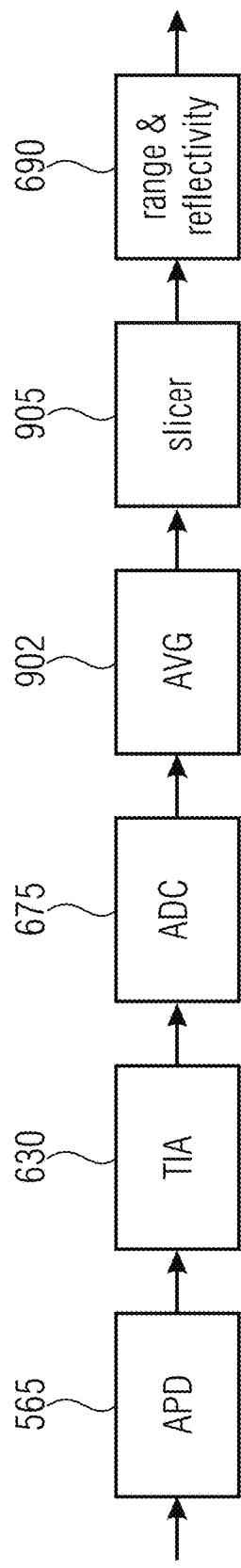

FIG. 9 comprises FIG. 9A schematically showing a multi-bit processing chain of a single channel and FIGS. 9B-9F showing diagrams showing exemplary signals of the individual processing elements of the multi-processing chain of FIG. 9A. Those elements of the receiver already described above in conjunction with FIGS. 5 to 8 have associated the same reference signs and are not described again.

The processing chain shown in FIG. 9A comprises an APD 565, a TIA 630, an analog to digital converter 675, an averaging element 902, a matched filter/slicer element 905 and a ranging/reflectivity element 690. The averaging element 655 is optional and may be configured to calculate an average resulting from the analog detection signals received in response to a plurality of laser pulses or shots emitted in the measurement period.

Figure 9B:
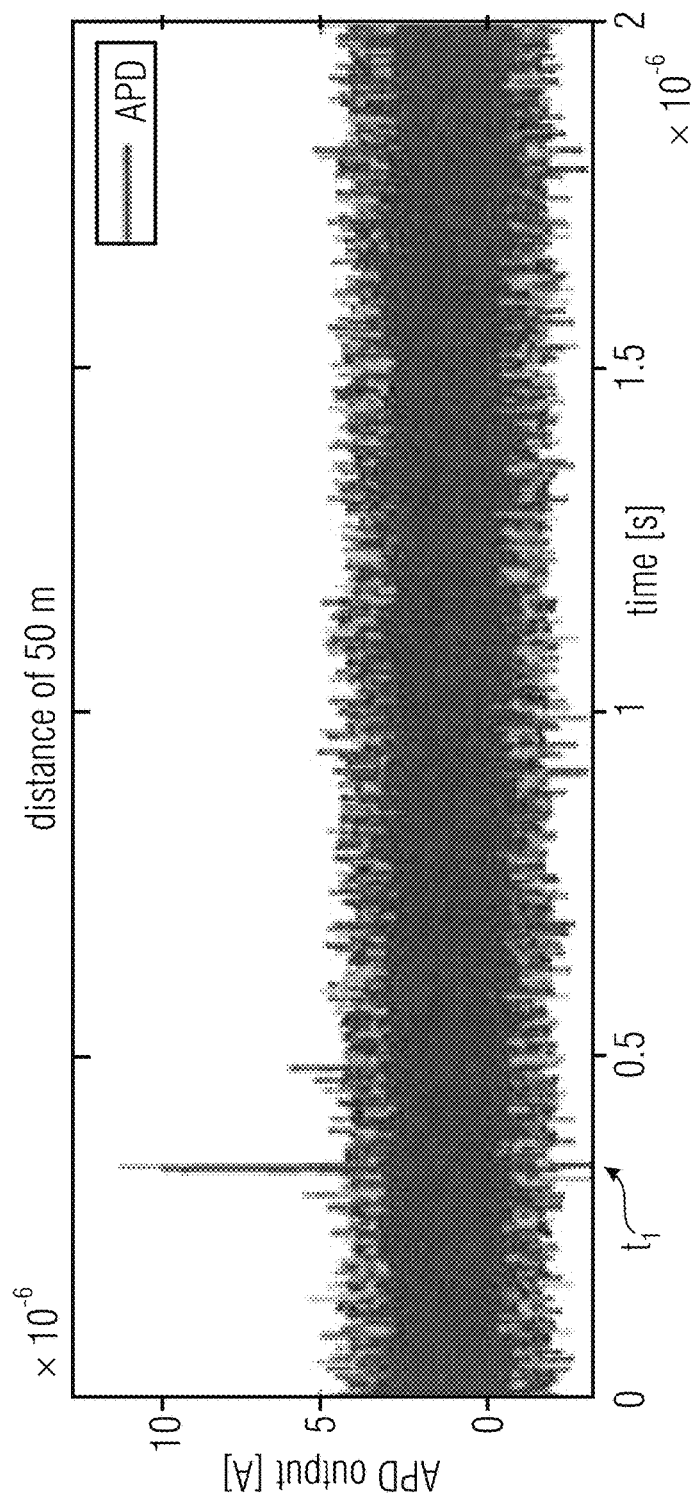

FIG. 9B shows—similar as FIG. 8B described above—a plurality of waveforms, each illustrating an output current of an element of the APD 565. The waveforms have the length of 2 μs, which is the exemplary capture time of the LIDAR system discussed in conjunction with FIG. 5 above. Each of the multiple waveforms shown in FIG. 9B results from a measurement (alternatively, from a simulation) for an individual angular position of the mirror 550 discussed in conjunction with FIG. 5. FIG. 9B has a noise floor between the lower shown ordinate and the current of approximately 5 μA. At an instant of time denoted as ti, a peak is visible in FIG. 9B. The peak has the current value of approximately 11 μA.

FIG. 9C shows—similar as FIG. 8C described above—a plurality of voltage waveforms, each waveform showing an output voltage of the TIA 630 provided in response to an input current of the element of APD 565 according to a waveform shown in FIG. 9B. Similar to the current waveforms shown in FIG. 9B, the waveforms shown in FIG. 9C have a noise floor originating at the lowest shown ordinate and the voltage of about 0.2 V. The peak at the instant of time ti has the voltage of approximately 0.7 V.

FIG. 9D shows—similar as FIG. 8D described above—the outputs of the analog to digital conversion in the element 675. The exemplary analog to digital conversion shown in FIG. 9D has the resolution of 8 bits. The digital representation may generally assume the values between 0 and 255, whereas the ordinate of the diagram in FIG. 9D is limited to approximately 140. The peak at the instant of time ti has the value of approximately 130. It is noted that relative to FIG. 8D, the peak in FIG. 9D has amplitude information, i.e., above mentioned value of 130, whereas the waveforms of the 1-bit conversion in FIG. 8D assume only one of two values 0 or 1. Therefore, the digitalized data provided by the multi-bit processing chain are suitable to determine, for example, a reflectivity parameter of an object in the target area of the LIDAR system.

Figure 9E:
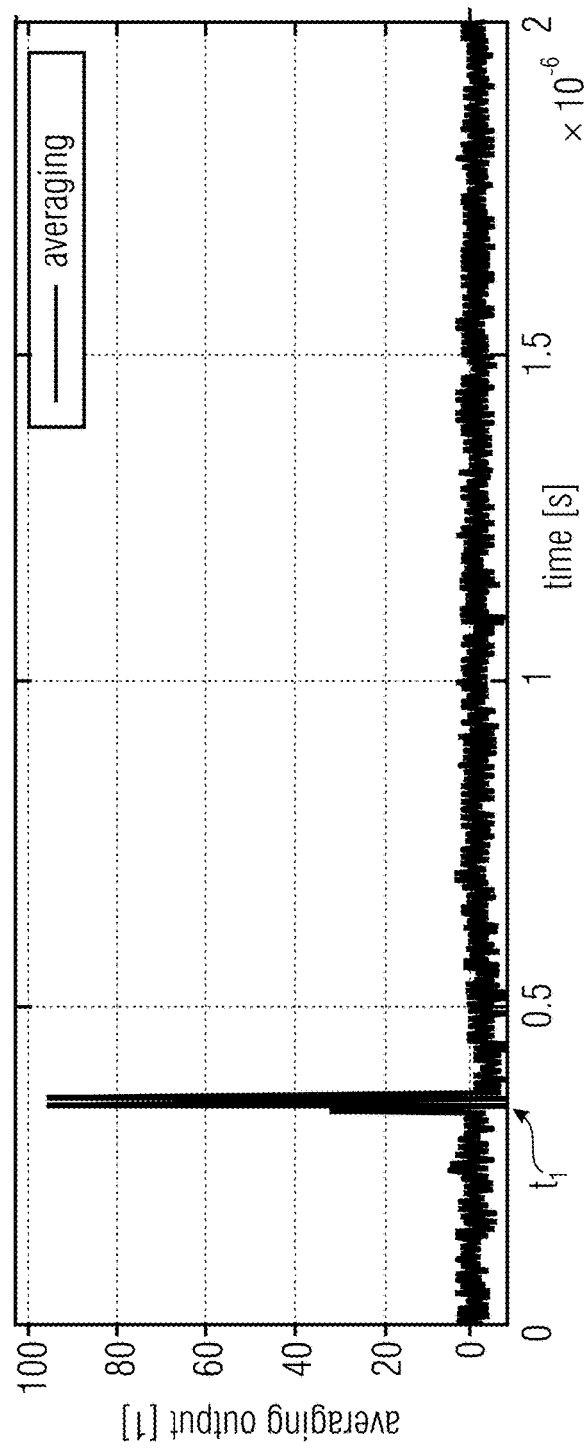

FIG. 9E shows a waveform being an output of the averaging element 902. The averaging is optionally performed for several laser pulses for a given angular position of the mirror 550. The averaging may be a full averaging having a sampling rate corresponding to the sampling rate of the averaging in the element 655 of the 1-bit chain or a reduced averaging having a sampling rate lower than the sampling rate of the element 655.

Figure 9F:
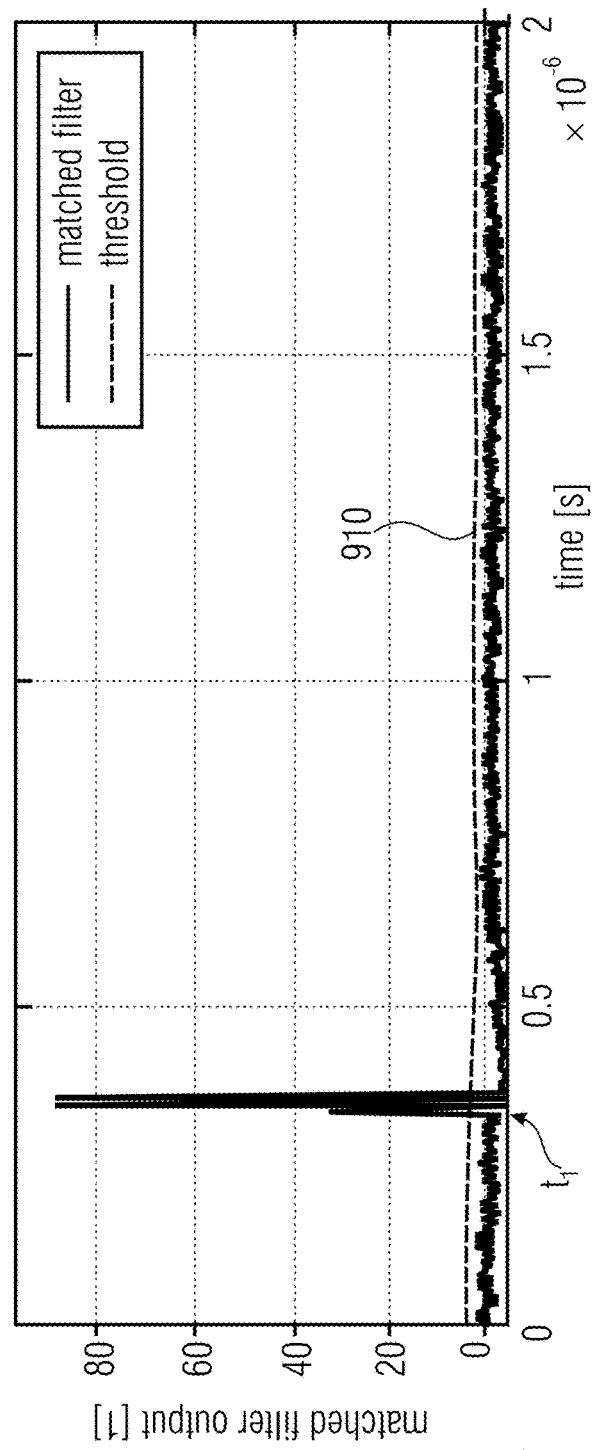

The peak at the instant of time ti is visible in FIG. 9E. FIG. 9F shows the waveform of FIG. 9E after processing in the matched filter/slicer element 905. FIG. 9E shows in addition a threshold line 910, which allows the multi-bit processing chain to delimit the noise floor from the peak at the instant of time ti. The exemplary peak value of 130 at the instant of time ti may, in an example, correspond to the reflectivity of 10%.

In some examples, the processing in the multi-bit processing chain shown in FIG. 9 may be performed with a lower sampling rate compared to the processing in the 1-bit processing chain discussed in conjunction with FIGS. 8 and 9 above. This may advantageously save resources such as silicon resource and/or computational power.

Figure 10A:
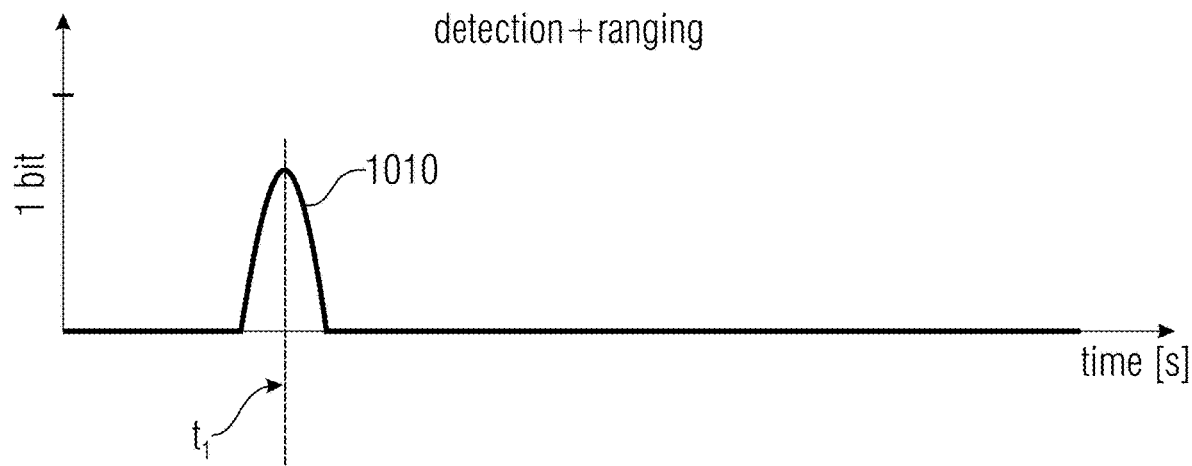
FIGS. 10A and 10B show schematically exemplary signals associated with the low-pass (LP) filter, according to an example.
Figure 10B:
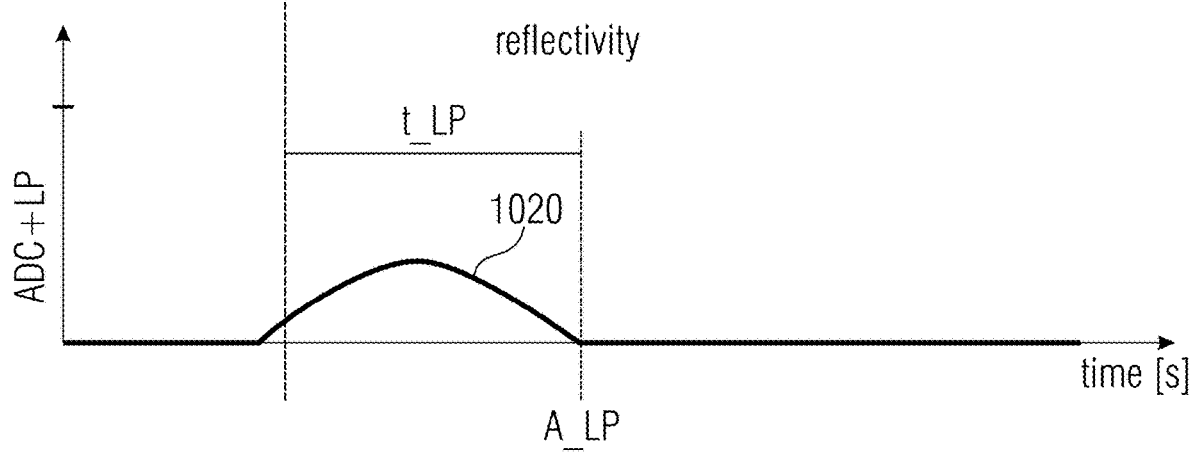

FIG. 10 shows schematically exemplary signals associated with the low-pass (LP) filters 685, 685a discussed in conjunction with FIG. 6 above. FIG. 10A shows an exemplary waveform for a 1-bit processing chain; FIG. 10B shows a corresponding waveform for a multi-bit processing chain. The waveforms in FIGS. 10A and 10B are depicted over time as the independent variable; the ordinates in FIGS. 10A and 10B relate to signal amplitudes.

The waveform in FIG. 10A comprises a signal peak 1010 at an instant of time $t_1$. The signal peak may correspond to a measured reflection from an object in the target area of the LIDAR system. Based on the measured signal shown in FIG. 10A, the detection element 665 and/or the ranging element 670 determine a distance of the object in the target area based on the determined time of the signal peak, i.e. based on the time instant ti. The distance is determined as described in conjunction with FIG. 8 above.

The waveform in FIG. 10B comprises a signal peak 1020. The signal peak 1020 is a result of low-pass filtering by using the filter element 685, 685a. The filtering changes the amplitude of the original signal (which is symbolically denoted in FIG. 10B by using the designation 'A_LP') and/or introduces a time delay or phase lag (which is symbolically denoted in FIG. 10B by using the designation 't_LP'). In an example, the alteration of the signal in the LP element 685 is (at least partially) compensated by the signal processing, for example, in the reflectivity element 695. More specifically, the filtered signal may be processed using the inverse transform of the LP filter.

While the LP filter element 685 is described as a digital filter located downstream the ADCs 675, the low-pass filtering may be instead or in addition located in the analog domain. In an example, an analog low pass filter 685a may be located upstream the ADCs 675, for example, in the signal path between the multiplexers 645a, 645b and the ADCs 645a, 645b, respectively. It is noted that also in case of the analog implementation of the LP filter, a compensation of the signal alteration introduced by the analog filter may be implemented in the digital domain, for example, similarly as described above in conjunction with the digital LP filter element 685.

The use of a digital LP filter allows for economical implementation and ease of configuration (e.g., the filter may be disabled and/or its cut-off frequency may be changed, for example, during the operation of the LIDAR system by software implemented in the controller of the LIDAR system). The use of an analog LP filter may allow for reducing the sampling frequency requirement for the ADCs. A combination of the analog and digital filtering may result in an optimum in terms of performance, cost, etc. for specific requirements of a LIDAR system.

Timing diagrams showing examples how analog detection signals from a number of detection elements may be applied to first and second converters are now described referring to FIGS. 11 to 14. Applying the signals or channels to the respective converters may be achieved by switching the multiplexers accordingly. In FIGS. 11 to 14, progress of time is in the horizontal direction as shown by an arrow 1105. Numbers −3, −2, −1, 0, 1, etc. below the arrow 1105 denote the progressing time in arbitrary units. A time range 1110 shows the timing for a first angle, i.e., a first angular position of the mirror 550, and a time range 1115 shows the timing for a second angle, i.e., a second angular position of the mirror 550. The first angle may be different than the second angle, for example, in case the time ranges 1110 and 1115 belong to the same frame. Alternatively, the first and second angle may correspond to the same mechanical position of the mirror 550, in case the time ranges 1110 and 1115 belong to different frames.

Each time range 1110 and 1115 is further split into time subranges 1110a, 1110b, 1110c, 1110d and 1115a, 1115b, 1115c, 1115d, respectively. The curved double lines in FIGS. 11 to 14 indicate that not all subranges are shown for clarity reasons. Each of the subranges corresponds to the capture time for a single laser pulse of the LIDAR system. In other words, each time subrange encompasses the emission of the laser pulse by the transmitter 510 (e.g., for 10 ns) and the corresponding capture of the reflected light by the receiver 520 (e.g., for 2 μs). Each subrange may be regarded as being associated with one laser shot.

As used in connection with FIGS. 11 to 14, the term channel stands for a respective TIA channel in which a detection signal stemming from one detection element is amplified. For example, CH1 stands for a signal received from a first detection element via a first TIA channel, CH2 for a signal received from a second detection element via a second TIA channel, and CHi for a signal received from an ith detection element via an ith TIA channel.

In the left part of FIGS. 11 to 14, the converter to which the signal of a respective detection element, i.e. channel, is applied, is indicated. In the examples shown, the first converter having the lower resolution is a comparator and the second converter having a higher resolution is an ADC. As indicated above, a receiver according to examples of the present disclosure may include a number of Y first converters, such as comparators, and a number of X second converters, such as ADCs. In examples of the present disclosure Y is higher than X.

Accordingly, FIGS. 11 to 14 show which detection signals are applied to which converter in each time subrange. For example, in FIG. 11, in subrange 1110a, channel CH1 is applied to the first ADC as indicated at 1120 and in subrange 1110b, channel CH2 is applied to the first ADC as indicated at 1135.

Figure 11:
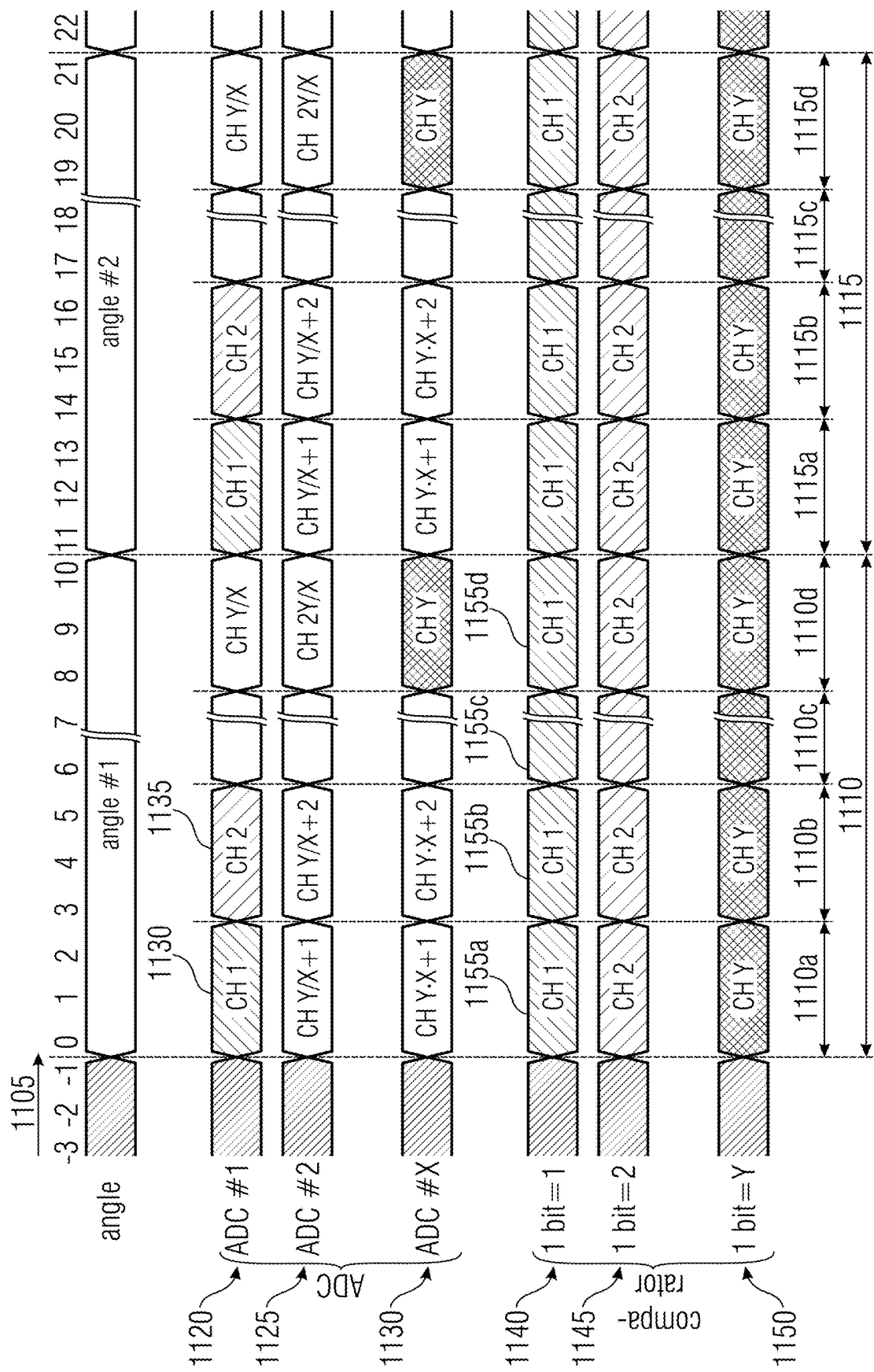
FIG. 11 shows exemplary timing diagram for a receiver, according to an example.

FIG. 11 shows a schematic multiplexing scheme of an example of a receiver having a number of X ADCs and Y comparators. According to the example shown, each time range 1110, 1115 is subdivided into Y/X subranges 1110a-1110d, 1115a-1115d. In each of the subranges a different channel is applied to each of the ADCs, i.e. channels CH1 to CH Y/X are applied to the first ADC as shown in line 1120, channels CH (X/Y)+1 to CH 2Y/X are applied to the second ADC as shown in line 1125, and so on. Finally, channels CH Y−X+1 to Ch Y are applied to the X-th ADC as shown in line 1130. Thus, there is one shot per channel for the higher resolution converters, i.e., the ADCs. As shown in lines 1140, 1145 and 1150 of FIG. 11, the same channel is applied to each of the comparators during all subranges 1110a to 1110d (and likewise 1115a to 1115d). In the example shown, the first channel is applied to the first comparator, as shown at 1155a, 1155b, 1155c and 1155d. Thus, in the example shown there are Y/X shots per channel for averaging for the comparators. This pattern may be repeated within the next time range 1115.

In the example of FIG. 11, the channel applied to each of the ADCs is changed in each subrange, shot, of a time range. The channel applied to the Comparator during the time range is averaged over the time range. In an example, the number of Comparators may correspond to the number of TIA channels. The number of ADCs may be two and the number of Comparators may be thirty-two. In other examples, the ratio may be different. The number of subranges of each range and, therefore, the number of shots which are averaged for each comparator depends on the ratio between Y and X.

It is noted that the multiplex patterns are not limited to those shown in the rows 1120, 1125, and 1130 of FIG. 11. Rather, any multiplexing pattern based, for example, on the region of interest of the LIDAR system, knowledge of the objects in the target area, for example, from previous frames or processing of the current frame, may be used. The envisaged patterns comprise the use of different channels in each time subrange in order to obtain the reflectivity for the greatest possible number of channels. The envisaged patters comprise the use of the same channel for a number of time subranges in order to allow for averaging for that channel and improve the signal to noise ratio for that channel. Any mixed form of the above described multiplexing schemes is considered to be within the scope of the present invention.

With reference to FIG. 7 discussed above, it is noted that multiplexing for the 1-bit channels is generally also envisaged. As explained above, by using the circuits 725a, 725b, the signals 723a, 723b may be switched to the comparator channels 750. Any multiplexing patterns envisaged for the multi-bit channels as described above may be used for the 1-bit channels as well. Selective use of region or regions of interest, scanning most possible locations in the target area and/or channel averaging may be applied.

Figure 12:
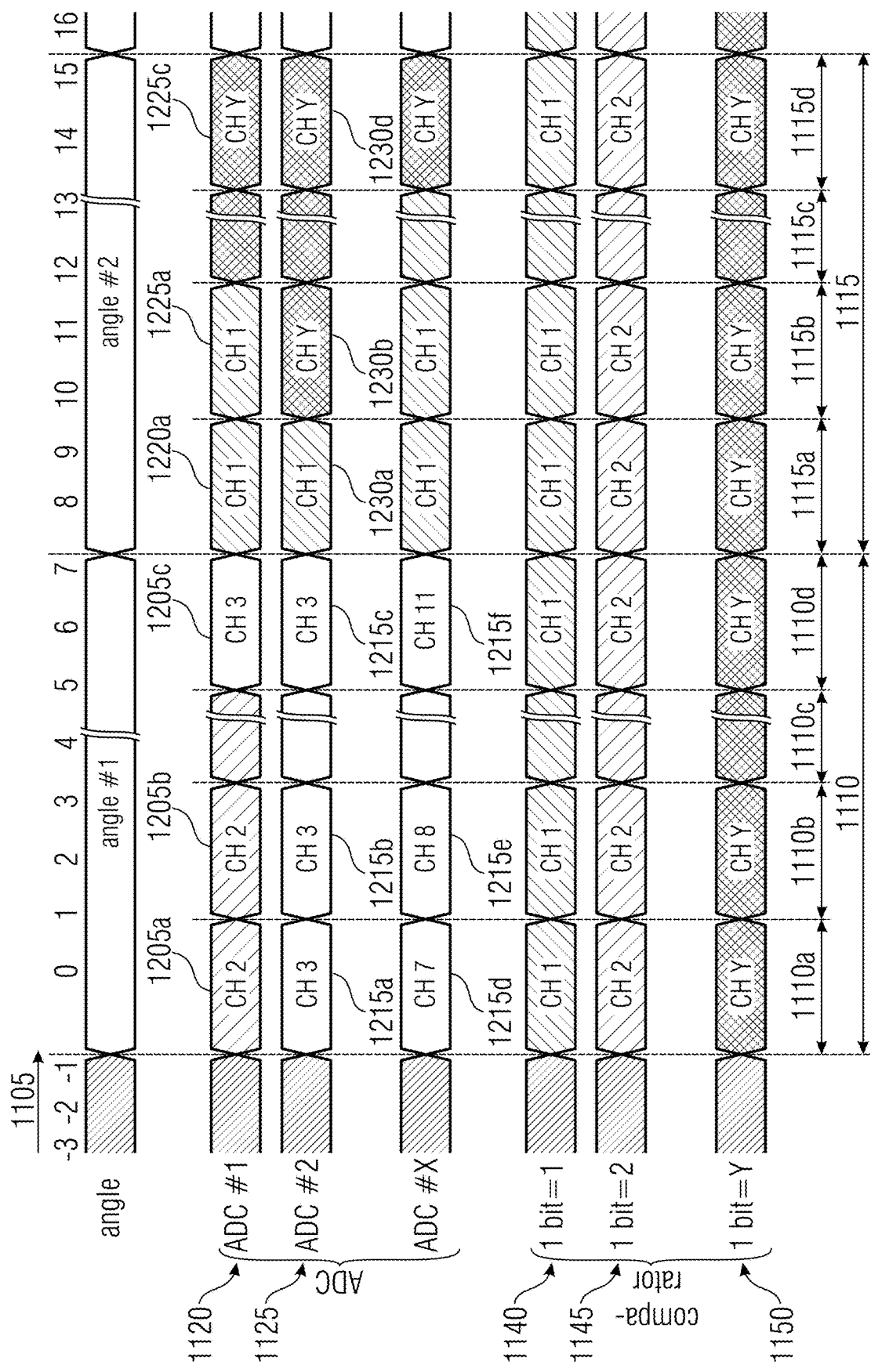
FIG. 12 shows another exemplary timing diagram for a receiver, according to an example.

FIG. 12 shows an exemplary time diagram for the receiver 600 or the receiver 700 described above in conjunction with FIGS. 6 and 7. It is noted that those elements already described above have associated the same reference signs and are not described again.

FIG. 12 shows exemplary multiplexing schemes in accordance with examples of the present disclosure. Different channels are applied to the respective ADCs during different subranges. The pattern in which channels are applied to the respective ADCs for a first angle may differ from the channels applied to the respective ADCs for a second angle. For example, as shown at 1205a and 1205b, for the first angle of the mirror 550 of the LIDAR system, i.e., for the time range 1110, channel CH2 is applied to the first ADC in subranges 1110a and 1110b. Channel CH3 may be applied to the first ADC in subrange 1110d as shown at 1205c. Channel CH3 may be applied to the second ADC during all subranges of time range 1110 as shown at 1215a, 1215b and 1215c. As shown at 1215d, 1215e and 1215f, channel CH7 may be applied to the X-the ADC during subrange 1110a, channel CH8 may be applied to the X-th ADC during subrange 1110b and channel CH11 may be applied to the X-th ADC during subrange 1110d. As shown at 1220a, 1225a, 1225c, 1230a, 1230b and 1230d, different channels, such as channels CH1 and CH Y, may be applied to the ADCs for the second angle. Thus, FIG. 12 shows that channels may be applied, i.e., multiplexed or switched, to the respective ADCs in an arbitrary and selective manner.

The time diagram with regard to the rows 1140, 1145, 1150 of FIG. 12 is described in conjunction with FIG. 11 above and is not described again.

Figure 13:
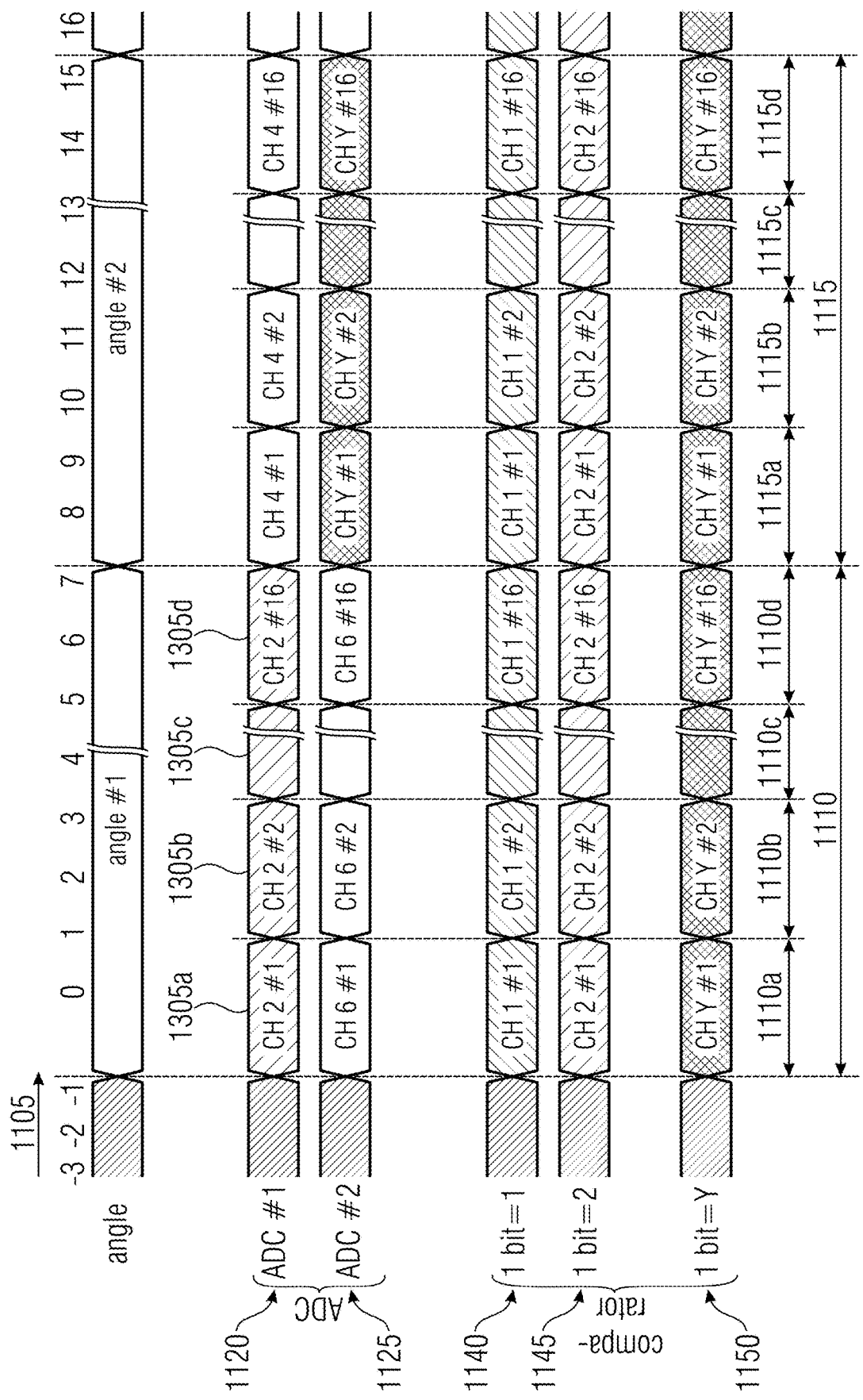
FIG. 13 shows another exemplary timing diagram for a receiver, according to an example.

FIG. 13 shows an exemplary time diagram for an example of a receiver according to the present disclosure, in which full averaging is used. Those elements already described above have associated the same reference signs and are not described again.

As shown in line 1120 and at 1305a, 1305b, 1305c, 1305d in FIG. 13, the channel applied to the first ADC remains the same during all subranges 1110a, 1110b, 1110c and 1110d. In the example shown there are sixteen shots for each channel as indicated by #1 to #16 associated with each of the channels in FIG. 13. The signals received during these shots may be averaged. Similar behavior is show in the remaining blocks of rows 1120 and 1125. To be more specific, in the example shown, channel CH2 is applied to the first ADC in first time range 1110, channel CH6 is applied to ADC2 in time range 1110, channel CH4 is applied to the first ADC in time range 1115, and channel CHY is applied to the second ADC in time range 1115. In other words, the multiplexing occurs only at the borders of the time ranges corresponding to the individual angles of the mirror 555 rather than during the time periods for measurements for the individual angles. Performing plural measurements for a single channel allows for averaging, for example, in the digital domain, and thereby improving the signal to noise ratio. In other words, the time diagram shown in FIG. 13 shows the use of averaging for performance instead of multiplexing. In the example shown in FIG. 13, an average factor of 16 is used. In other examples, other average factors may be used for the high resolution channel(s). For example, two high resolution channels may be multiplexed to the same converter with ½ averaging. The high resolution channels for full averaging may be selected based on the detection results of earlier detections. For example, channels indicating a target in an earlier detection may be selected for full high resolution averaging in order to obtain additional information on the target.

The example in FIG. 12 shows a potential implementation of a ROI (region of interest) based on the a-priori knowledge, e.g., from previous frames. The example in FIG. 13 focuses all ADC processing power on one channel. The example in FIG. 11 spreads all ADC processing power among all channels. The example in FIG. 12 is an intermediate solution between the two other approaches. It spreads the full ADC processing power on a selected number of channels.

Figure 14:
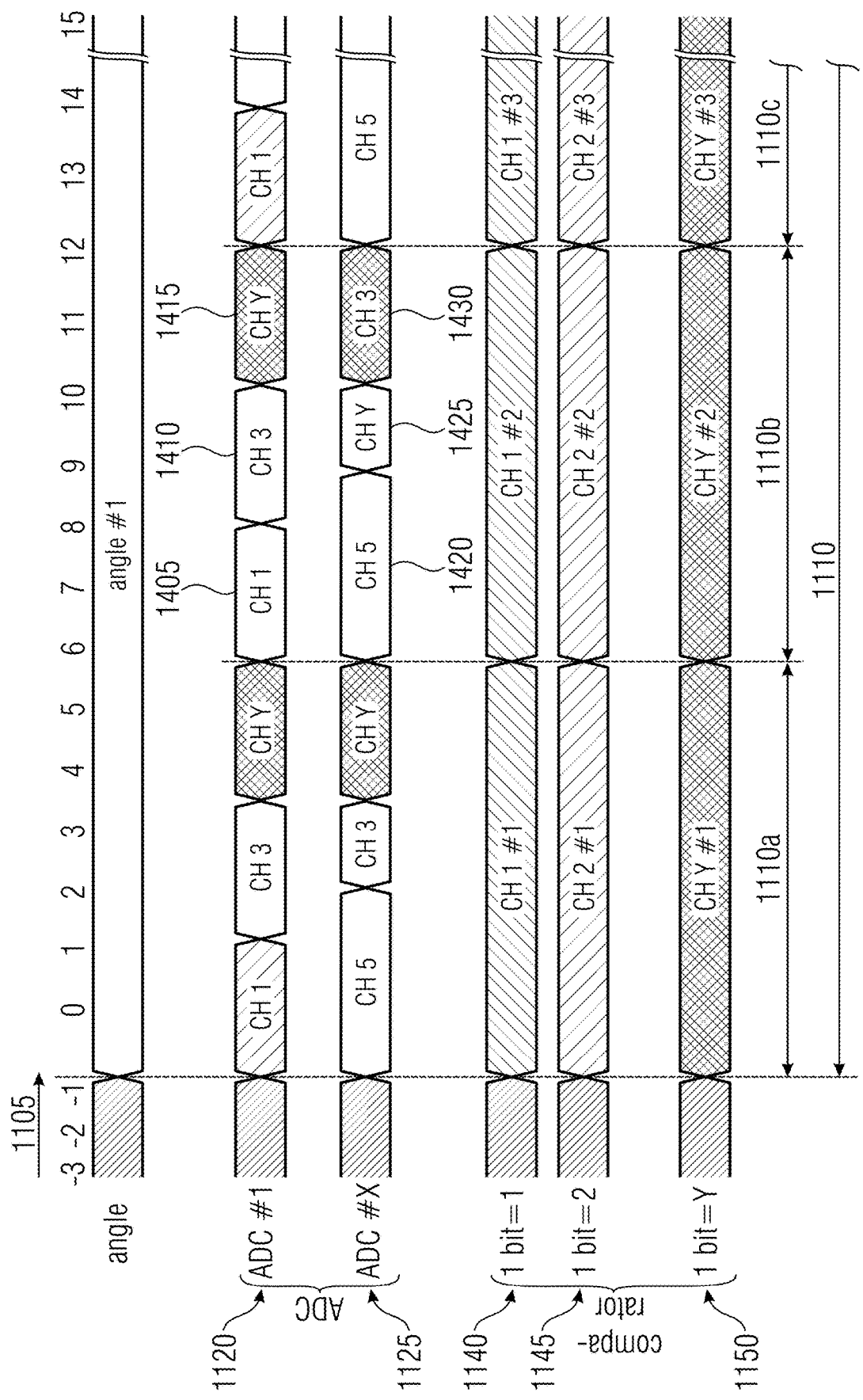
FIG. 14 shows another exemplary timing diagram for a receiver, according to an example.

FIG. 14 shows an exemplary time diagram for a receiver according to the present disclosure. Those elements already described above have associated the same reference signs and are not described again.

FIG. 14 shows a portion of the time range 1110 corresponding to the first angular position of the mirror 550 of the LIDAR system described in conjunction with FIGS. 11 to 13 above. In FIG. 14, the time subranges 1110a, 1110b and a part of the time subrange 1110c are shown. Those elements already described above have associated the same reference signs and are not described again.

In the time diagram shown in FIG. 14, the multiplexing occurs at a time granularity finer than the time granularity of the subranges 1110a, 1110b, 1110c. In other words, different channels are applied to the ADCs 675 during a capture time (measurement duration) associated with a single laser pulse of the LIDAR system. For example, the blocks 1405, 1410 and 1415 illustrate that 'CH1' is applied to the first ADCs 675 for about ⅓ of the capture time (⅓ of the time subrange 1110b), 'CH3' is applied to the first ADC for about ⅓ of the capture time, and THY' is applied to the first ADC for ⅓ of the capture time. The blocks 1420, 1425, and 1430 illustrate that 'CH5' is applied the X-th ADC for about ½ of the capture time (⅓ of the time subrange 1110b), THY' is applied to the second ADC for a short time and, thereupon, 'CH3' is applied to the second ADC for about ⅓ of the capture time.

It is noted that the multiplexers 640 may generally switch different channels to the respective ADCs 675 at any instant of time. The fractions of the capture time (time subrange 1110b) as described above are intended to be for illustrative purposes.

Switching the ADCs inputs during a capture time of the single laser pulse allows for a large number (e.g., maximal number) of averaging, which in turn may result in improved range/reflectivity performance.

Figure 15:
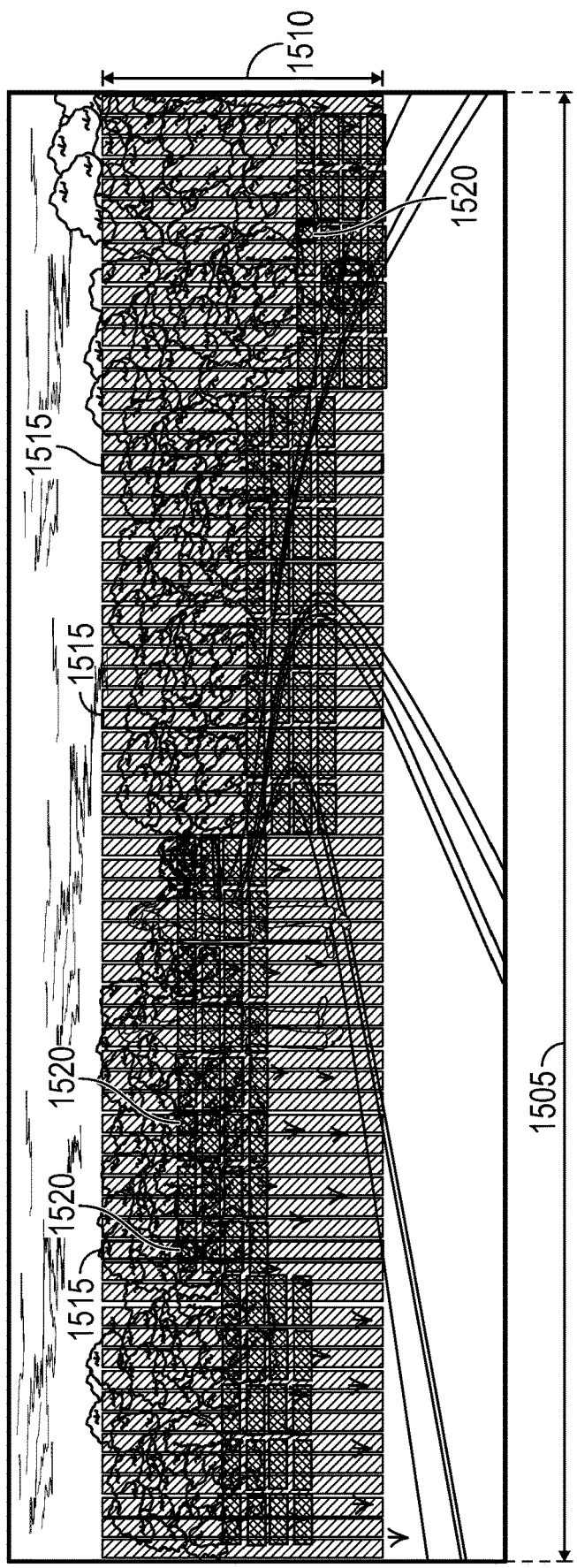
FIG. 15 shows an exemplary target area (scenery) of a LIDAR system, according to an example.

FIG. 15 shows an exemplary target area (scenery) of the LIDAR system 500. The exemplary target area is directed to a possible application of the LIDAR system 500 as an automotive sensor. The target area comprises a road with lane markings, two persons standing at an edge of the road, a ball located at another of the road and green belts adjacent to the road. The horizontal dimension of the area, which is illuminated by the laser of the LIDAR system 500, is identified by using the arrow 1505; the vertical dimension of the illuminated area is identified by using the arrow 1510.

The entire illuminated area is covered by vertical bars, three of which are exemplarily designated as 1515. Each vertical bar represents a vertical laser beam 535 for a particular angular position of the mirror 550. The vertical bars in FIG. 15 represent an area, which is scanned and evaluated by using the 1-bit processing in order to provide detection and/or ranging parameters without reflectivity measurement.

Portions of the illuminated area, three of which are exemplarily designated as 1520, are shown in FIG. 15. Those portions define a region of interest (ROI) for which reflectivity measurements by using the multi-bit processing are performed. For example, for a number of ADCs 675 being lower by a factor of x than the number of individual elements of the 2D array 535 along the vertical direction (as described in conjunction with FIG. 5 above), 1/x of the vertical illuminated area (i.e., 1/x of the vertical FoV) may be scanned by using the ADCs 675 in order to determine the reflectivity parameter. In an example, ½ averaging may be performed for 2/x of the vertical FoV. In another example, full averaging may be performed for 1/x of the vertical FoV (assuming x ADCs).

In an example, a selection module of the LIDAR system 500 determines the ROI and selects appropriate multiplexing. More specifically, the selection module determines for which angular positions of the mirrors, which TIA channels are switched to the ADCs 675 at which instant of times by the multiplexers 640. In other words, the selection module determines a timing schedule for the multiplexers, which may be similar to any of the schedules explained in conjunction with FIGS. 11 to 14 above.

The selection module may determine the ROI based on any predetermined parameters of the LIDAR system 500, such as settings determining certain angles as the ROI. Alternatively, or in addition, the selection module may dynamically determine the ROI using any previous knowledge about the illuminated scenery obtained by the LIDAR system 500. The previous knowledge may comprise any results of evaluation of the previous frames/scans. Alternatively, or in addition, the previous knowledge may comprise any results of evaluation of the current frame/scan obtained from the 1-bit processing chain.

Figure 16A:
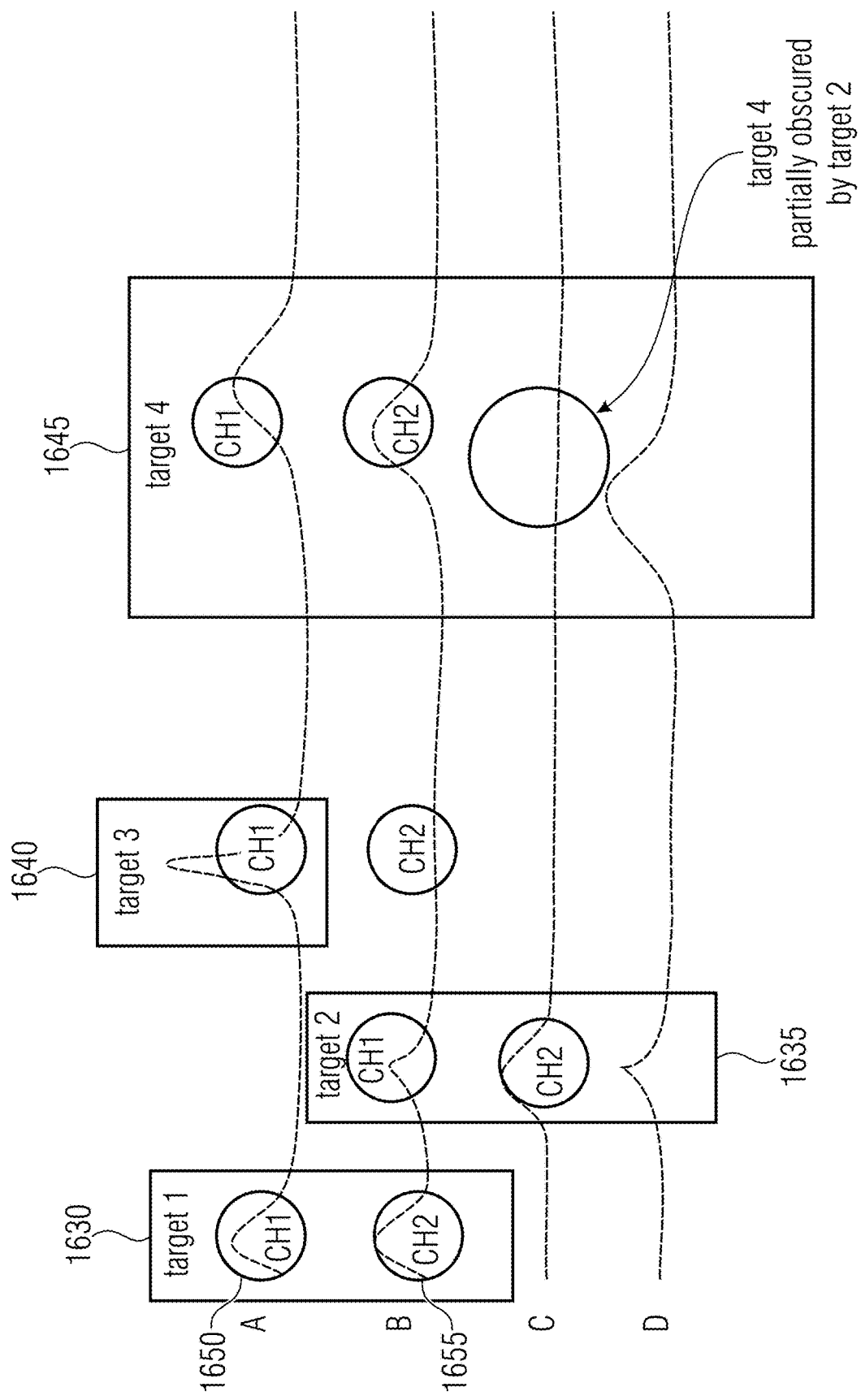
FIG. 16A shows a partial point cloud profile with target points-of-interest (POI)
Figure 16B:
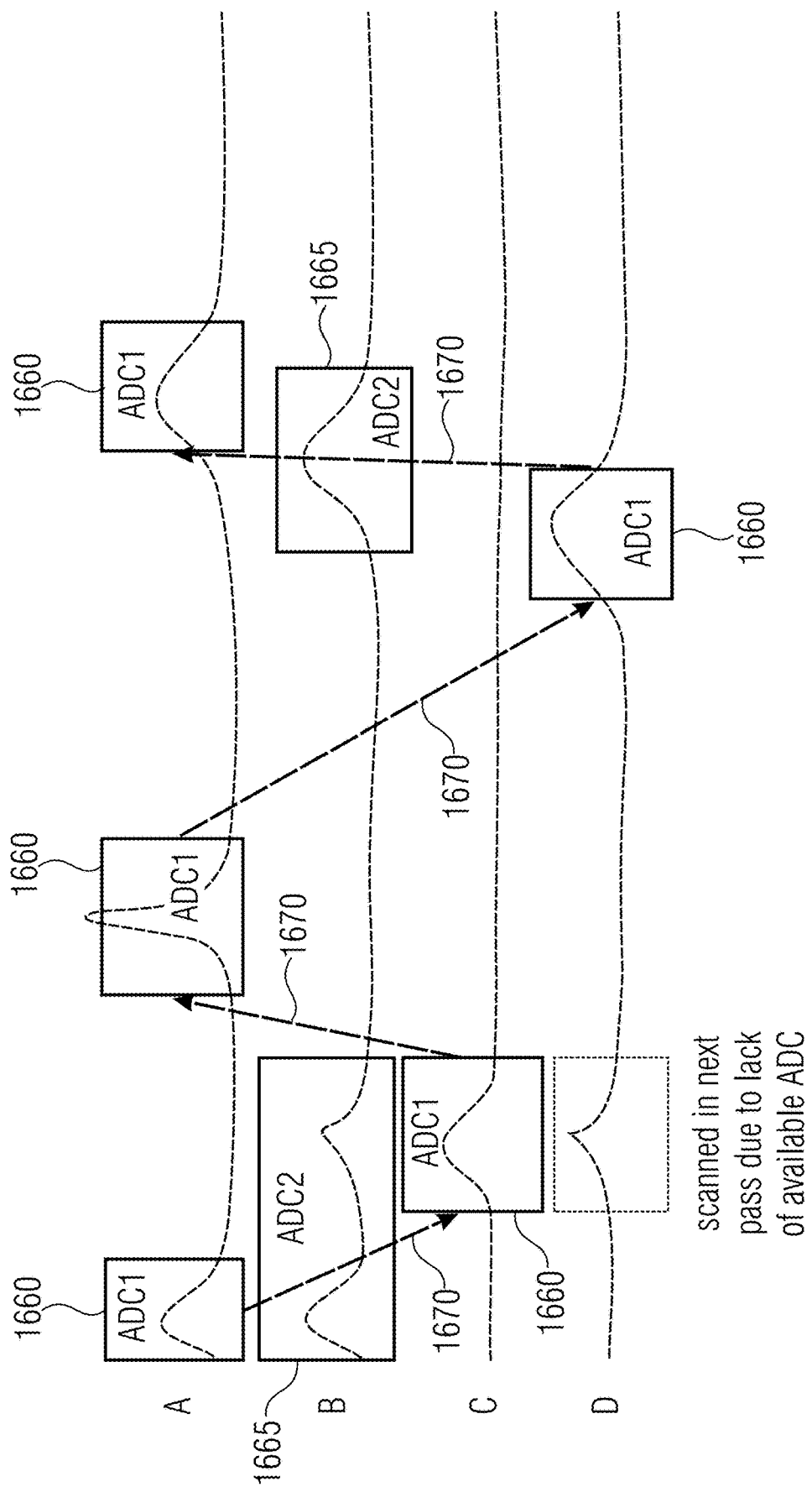
FIG. 16B illustrating a rapid POI scanning with two ADCs, according to an example.

FIG. 16 comprises FIGS. 16A and 16B. FIG. 16A shows a partial point cloud profile with target points-of-interest (POI); FIG. 16B illustrates a rapid POI scanning with two ADCs.

FIG. 16A shows 4 signal waveforms A 1610, B 1615, C 1620 and D 1625, each corresponding a capture time of the LIDAR system 500. The scenery comprises 4 targets, namely Target 1 1630, Target 2 1635, Target 3 1640 and Target 4 1645. A 1-bit scanning subsystem profiles a (e.g., partial) point cloud for target POIs. FIG. 16A shows also channels CH1 1650 and CH2 1655. A part of Target 4 1645 is partially obscured (e.g., hidden or blurred) by Target 2.

FIG. 16B illustrates additional scan (or scans) scheduled, for example, by the selection module, for the ADCs 675 to sample the POIs (or ROIs) in the (e.g., partial) point cloud. The multiplexers 640 switch rapidly from pixel to pixel during (e.g., real time) measurement. In other words, a multi-bit processing chain (an ADC channel) is changed by the selection module during a single capture time for a single lasers pulse exploiting knowledge about the expected time-of-arrival. The (e.g., a priori) knowledge may be obtained from evaluation the 1-bit channel (or channels) or from a previous frame (or frames). The ADCs 675 capture the signal peak in the profiled window to estimate the reflectivity in the element 690. The reflectivity parameter (or alternatively, the amplitude) is provided (transmitted) with point cloud pixel time of flight (ToF). FIG. 16B shows capture windows 1660 and 1665 are scheduled by the selection module for the multiplexers 640 and ADCs 675, respectively. The switching pattern for one multiplexer 640 is shown by arrows 1670. The selection module may also take into account the number of the available ADCs and to schedule a window to be scanned in the next pass (e.g., a next frame) due to a lack of available ADCs in the present frame.

It is understood that the receiver, the LIDAR system and the method of the present invention are not limited to the 1D oscillating mirror in accordance with the examples described above. Rather, the present invention could also be applied in other approaches, for example, in a flash LIDAR, in a 2D mirror LIDAR or the like. In other words, the references to the 1D oscillating mirror LIDAR in the present patent application are intended to be for illustrative purposes only.

In the following, further examples of the disclosure are described. The examples described below may constitute alternatives or may be considered in addition to the aspects disclosed above.

In the following, an architecture with respect to a specific implementation using 32 channels and 16 times oversampling is described. It is noted that the invention can be used for different use-cases.

The system may be split into: 2 channels with 8-bit processing chain with no oversampling, or 32 channels with 1-bit processing chain with 16× oversampling.

The 1-bit processing may shoot 16× at the same FoV. During that time, 2 channel ADCs may be used to switch the 32 channels and record one shot per FoV. That is, the 1-bit signal chain may exploit full parallelism to perform as much averaging as possible, while the high-resolution (ADC) may use the minimum on parallel channels to record at least one shot per frame.

The following derivatives may be implemented (individually or in combination):

8-bit/1-bit data-streams may be merged and used for ranging/detection to enhance the performance;

1-bit converter and multiplexing may be implemented with external components;

1-bit processing may be implemented with higher sampling rate compared to the ADC;

The high-resolution (ADC) channels may also perform oversampling (but reduced compared to the 1-bit architecture); and/or The high-resolution channel may employ an additional low-pass filter to further reduce the bandwidth. This will reduce the noise level and make the reflectivity measurement more accurate (the reduced gain may be compensated in post processing).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, one or more of the most important method steps may be executed by such an apparatus.

Depending on certain implementation requirements, examples of the disclosure can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Generally, examples of the disclosure can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an example of the disclosure is, therefore, a computer program having a program code for performing one of the methods described herein, when the computer program runs on a computer.

A further example of the disclosed methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further example of the disclosed methods is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example of the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described examples are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

What is claimed is:

1. A receiver for a light detection and ranging (LIDAR) system, the receiver comprising:
    a plurality of detecting elements, each detecting element comprising one or more members configured to convert light into an electric signal, each detecting element configured to generate an analog detection signal in response to a laser pulse emitted by a transmitter of the LIDAR system;

a first converting element configured to generate a first digital detection signal in response to a first analog detection signal provided by at least a first one of the plurality of detecting elements, wherein the first converting element is configured to generate the first digital detection signal having a first number of bits that represent the first analog detection signal;

a second converting element configured to generate a second digital detection signal in response to a second analog detection signal provided by at least a second one of the plurality of detecting elements, wherein the second converting element is configured to generate the second digital detection signal having a second number of bits that represent the second analog detection signal, the second number of bits being greater than the first number of bits, wherein the first one of the plurality of detecting elements and the second one of the plurality of detecting elements are same or different detecting elements; and at least one processor configured to determine at least a first parameter of an object in a target area of the LIDAR system using the first digital detection signal and determine a second parameter of the object using the second digital detection signal.

2. The receiver of claim 1, wherein
the first digital detection signal is a one bit signal,
the first converting element is a comparator using one bit to represent the first analog detection signal,
the second digital detection signal is a two or more bit signal, and
the second converting element is an analog to digital converter using two or more bits to represent the second analog detection signal.

3. The receiver of claim 1, wherein
the first analog detection signal and the second analog detection signal are provided by a same one of the plurality of detecting elements such that the first one of the plurality of detecting elements and the second one of the plurality of detecting elements are a same detecting element.

4. The receiver of claim 1, wherein:
the receiver further comprises a first multiplexer coupled to a first subset of detecting elements comprising two or more of the plurality of detecting elements and configured to receive analog detection signals from the first subset of detecting elements and selectively output one of the analog detection signals received from the first subset of detecting elements as the first analog detection signal provided to the first converting element.

5. The receiver of claim 4, wherein:
the receiver further comprises a second multiplexer coupled to a second subset of detecting elements comprising two or more of the plurality of detecting elements and configured to receive analog detection signals from the second subset of detecting elements and selectively output one of the analog detection signals received from the second subset of detecting elements as the second analog detection signal provided to the second converting element.

6. The receiver of claim 5, wherein:
the first subset of detecting elements and the second subset of detecting elements comprise a same ones of the plurality of detecting elements.

7. The receiver of claim 5, wherein:
the second multiplexer is configured to, for each laser pulse of a plurality of laser pulses emitted during a measurement period to a location in the target area, selectively output a different one of the analog detection signals received from the second subset of detecting elements as the second analog detection signal provided to the second converting element.

8. The receiver of claim 4, wherein:
the first multiplexer is configured to, for each laser pulse of a plurality of laser pulses emitted during a measurement period to a location in the target area, switch which of the analog detection signals received from the first subset of detecting elements is output as the first analog detection signal provided to the first converting element.

9. The receiver of claim 5, wherein:
the second multiplexer is configured to, for each laser pulse of a plurality of laser pulses emitted during a measurement period to a location in the target area, switch which of the analog detection signals received from the second subset of detecting elements is output as the second analog detection signal provided to the second converting element.

10. The receiver of claim 8, wherein:
the receiver further comprises:
a selection circuit configured to select which of the analog detection signals received from the first subset of detecting elements is output by the first multiplexer as the first analog detection signal provided to the first converting element based on a region of interest in the target area of the LIDAR system.

11. The receiver of claim 10, wherein:
the selection circuit is configured to determine the region of interest using at least one of a previous first digital detection signals or a previous second digital detection signal.

12. The receiver of claim 8, wherein:
the first converting element is configured to generate a plurality of first digital detection signals corresponding to the analog detection signals received from the first subset of detecting elements during the measurement period, and
the at least one processor is configured to calculate an average of the plurality of first digital detection signals.

13. The receiver of claim 7, wherein:
the plurality of laser pulses emitted during the measurement period comprises two or more laser pulses emitted for a single angle setting of the LIDAR system.

14. The receiver of claim 5, wherein:
the second multiplexer is configured to, during a measurement duration associated with a single laser pulse emitted to a location in the target area, switch which of the analog detection signals received from the second subset of detecting elements is output as the second analog detection signal provided to the second converting element.

15. The receiver of claim 14, wherein:
the receiver further comprises a selection circuit configured to select which of the analog detection signals received from the second subset of detecting elements is output by the second multiplexer as the second analog detection signal provided to the second converting element based on at least one of a previous first digital detection signals, a previous second digital detection signal, or the first digital detection signal.

16. The receiver of claim 1, wherein:
the second parameter is a reflectivity parameter, and
the at least one processor is configured to use the first digital detection signal in the determining the reflectivity parameter.

17. The receiver of claim 1, wherein:
the first parameter is a detection parameter or a ranging parameter, and the at least one processor is configured to use the second digital detection signal in the determining the first parameter.

18. The receiver of claim 1, wherein:
the receiver further comprises at least one analog low-pass filter arranged upstream from the second converting element,
wherein the analog low-pass filter is configured to low-pass filter the second analog detection signal before supplying the second analog detection signal to the second converting element.

19. The receiver of claim 18, wherein:
the at least one processor is configured to at least partially compensate for a modification in the second digital detection signal of the second converting element introduced by the analog low-pass filter by using an inverted transfer function of the analog low-pass filter.

20. The receiver of claim 1, wherein:
the receiver further comprises at least one digital low-pass filter arranged downstream from the second converting element,
wherein the digital low-pass filter is configured to low-pass filter the second digital detection signal provided by the second converting element.

21. The receiver of claim 20, wherein:
the at least one processor is configured to at least partially compensate for a modification in the second digital detection signal of the second converting element introduced by the digital low-pass filter by using an inverted transfer function of the digital low-pass filter.

22. The receiver of claim 1, wherein:
a sampling rate of the first converting element is higher than a sampling rate of the second converting element.

23. The receiver of claim 1, wherein:
the at least one processor is configured to calculate an average of a plurality of first digital detection signals obtained for a plurality of laser pulses emitted during a measurement period to a location in the target area.

24. The receiver of claim 1, wherein:
the receiver further comprises a second multiplexer coupled to a second subset of detecting elements comprising two or more of the plurality of detecting elements and configured to receive analog detection signals from the second subset of detecting elements and selectively output one of the analog detection signals received from the second subset of detecting elements as the second analog detection signal provided to the second converting element.

25. A light detection and ranging (LIDAR) system comprising:
a transmitter comprising a laser and a deflector configured to deflect a laser beam output by the laser to different locations of a target area; and
a receiver comprising:
a plurality of detecting elements, each detecting element comprising one or more members configured to convert light into an electric signal, each detecting element configured to generate an analog detection signal in response to a laser pulse emitted by a transmitter of the LIDAR system;
a first converting element configured to generate a first digital detection signal in response to a first analog detection signal provided by at least a first one of the plurality of detecting elements, wherein the first converting element is configured to use a first number of bits in the first digital detection signal to represent the first analog detection signal;
a second converting element configured to generate a second digital detection signal in response to a second analog detection signal provided by at least a second one of the plurality of detecting elements, wherein the second converting element is configured to use a second number of bits in the second digital detection signal to represent the second analog detection signal, the second number of bits being greater than the first number of bits, wherein the first one of the plurality of detecting elements and the second one of the plurality of detecting elements are same or different detecting elements; and
a at least one processor configured to determine at least a first parameter of an object in a target area of the LIDAR system using the first digital detection signal and determine a second parameter of the object using the second digital detection signal.

26. A method for operating a receiver of a light detection and ranging (LIDAR) system, the method comprising:
generating, by each of a plurality of detecting elements, an analog detection signal in response to a laser pulse emitted by a transmitter of the LIDAR system, each detecting element comprising one or more members configured to convert light into an electric signal;
generating, by a first converting element, a first digital detection signal in response to a first analog detection signal provided by at least a first one of the plurality of detecting elements, wherein the first converting element generates the first digital detection signal having a first number of bits that represent the first analog detection signal;
generating, by a second converting element, a second digital detection signal in response to a second analog detection signal provided by at least a second one of the plurality of detecting elements, wherein the second converting element generates the second digital detection signal having a second number of bits that represent the second analog detection signal, the second number of bits being greater than the first number of bits, wherein the first one of the plurality of detecting elements and the second one of the plurality of detecting elements are same or different detecting elements;
determining, by at least one processor, at least a first parameter of an object in a target area of the LIDAR system using the first digital detection signal; and
determining, by the at least one processor, a second parameter of the object using the second digital detection signal.

* * * * *